United States Patent
Wood et al.

(10) Patent No.: US 10,385,213 B2
(45) Date of Patent: Aug. 20, 2019

(54) CANDLE WAX COMPOSITIONS STABILIZED WITH UV ABSORBERS AND SELECT HINDERED AMINE LIGHT STABILIZERS

(71) Applicant: BASF SE, Ludwigshafen (DE)

(72) Inventors: Mervin G. Wood, Riverview, MI (US); Diane T. Langer, Canton, MI (US); Don M. Barber, White Lake, MI (US); Leo Devota, Chesaning, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/540,550

(22) PCT Filed: Dec. 31, 2015

(86) PCT No.: PCT/US2015/068265
§ 371 (c)(1),
(2) Date: Jun. 28, 2017

(87) PCT Pub. No.: WO2016/109789
PCT Pub. Date: Jul. 7, 2016

(65) Prior Publication Data
US 2018/0002527 A1 Jan. 4, 2018

Related U.S. Application Data

(60) Provisional application No. 62/098,908, filed on Dec. 31, 2014.

(51) Int. Cl.
| | |
|---|---|
| *C08K 3/08* | (2006.01) |
| *C08K 5/00* | (2006.01) |
| *C11C 5/00* | (2006.01) |
| *C08L 91/06* | (2006.01) |
| *C08K 5/3432* | (2006.01) |
| *C08K 5/47* | (2006.01) |

(52) U.S. Cl.
CPC ............... *C08L 91/06* (2013.01); *C08K 3/08* (2013.01); *C08K 5/005* (2013.01); *C08K 5/3432* (2013.01); *C08K 5/47* (2013.01); *C11C 5/002* (2013.01)

(58) Field of Classification Search
CPC ........ C08K 3/08; C08K 5/005; C08K 5/3432; C08K 5/47; C08L 91/06; C11C 5/002
See application file for complete search history.

(56) References Cited

U.S. PATENT DOCUMENTS

| | | |
|---|---|---|
| 4,049,647 A * | 9/1977 | Holt ............. C07D 211/46 524/102 |
| 4,231,921 A | 11/1980 | Moser |
| 4,590,231 A | 5/1986 | Seltzer et al. |
| 4,612,393 A | 9/1986 | Ravichandran et al. |
| 4,649,221 A | 3/1987 | Ravichandran et al. |
| 4,666,962 A | 5/1987 | Ravichandran et al. |
| 4,666,963 A | 5/1987 | Ravichandran et al. |
| 4,668,721 A | 5/1987 | Seltzer et al. |
| 4,678,826 A | 7/1987 | Pastor et al. |
| 4,691,015 A | 9/1987 | Behrens et al. |
| 4,696,964 A | 9/1987 | Ravichandran |
| 4,703,073 A | 10/1987 | Winter et al. |
| 4,720,517 A | 1/1988 | Ravichandran et al. |
| 4,753,972 A | 6/1988 | Ravichandran |
| 4,757,102 A | 7/1988 | Ravichandran et al. |
| 4,760,179 A | 7/1988 | Ravichandran |
| 4,782,105 A | 11/1988 | Ravichandran et al. |
| 4,831,134 A | 5/1989 | Winter et al. |
| 4,876,300 A | 10/1989 | Seltzer et al. |
| 4,898,901 A | 2/1990 | Ravichandran et al. |
| 4,929,657 A | 5/1990 | Ravichandran |
| 4,942,238 A * | 7/1990 | Rytz ............. C07D 211/46 546/242 |
| 5,006,577 A | 4/1991 | Behrens et al. |
| 5,019,285 A | 5/1991 | Evans et al. |
| 5,021,479 A | 6/1991 | Ravichandran et al. |
| 5,045,583 A | 9/1991 | Odorisio et al. |
| 5,057,563 A | 10/1991 | Ravichandran |
| 5,064,883 A | 11/1991 | Behrens et al. |
| 5,081,300 A | 1/1992 | Odorisio et al. |
| 5,162,408 A | 11/1992 | Odorisio et al. |
| 5,185,448 A | 2/1993 | Odorisio et al. |
| 5,235,056 A | 8/1993 | Cunkle et al. |
| 5,844,029 A | 12/1998 | Prabhu et al. |
| 5,880,191 A | 3/1999 | Prabhu et al. |

(Continued)

FOREIGN PATENT DOCUMENTS

| | | | |
|---|---|---|---|
| WO | WO-02/079314 | 10/2002 | |
| WO | WO-2015004580 A1 * | 1/2015 | ........... C08K 5/3435 |

OTHER PUBLICATIONS

International Search Report and Written Opinion in International Application No. PCT/US2015/068265, dated Jun. 3, 2016 (13 pages).

*Primary Examiner* — Latosha Hines
(74) *Attorney, Agent, or Firm* — Foley & Lardner LLP

(57) ABSTRACT

A stabilized composition includes candle wax; an ultraviolet light absorber; and a hindered amine light stabilizer of formula (I). The compositions stabilize the candle with respect to yellowing, color fading in the case of dyed or pigmented candles, and other degradation of the waxes. The materials and compositions may be used in a wide variety of a candle waxes including, but not limited to, paraffin, beeswax, natural oils, polyamide plus fatty acids and esters thereof, fatty acids such as stearin, opacifiers, glycerides plus oxidized wax, alcohols, and ethylene oligomers.

20 Claims, No Drawings

(56) References Cited

U.S. PATENT DOCUMENTS

| | | | |
|---|---|---|---|
| 5,922,794 A | 7/1999 | Prabhu et al. | |
| 6,221,115 B1 | 4/2001 | Hyun et al. | |
| 6,296,674 B1 | 10/2001 | Trainor et al. | |
| 6,562,083 B2 | 5/2003 | Wood et al. | |
| 6,562,085 B1 | 5/2003 | Wood et al. | |
| 6,667,403 B2 | 12/2003 | Wood et al. | |
| 6,699,298 B2 | 3/2004 | Wood et al. | |
| 6,740,132 B2 | 5/2004 | Wood et al. | |
| 6,905,525 B2 | 6/2005 | Wood et al. | |
| 2003/0192231 A1* | 10/2003 | Wood | C08K 5/005 44/275 |
| 2012/0027960 A1* | 2/2012 | Xu | C07D 211/46 428/1.2 |

\* cited by examiner

CANDLE WAX COMPOSITIONS STABILIZED WITH UV ABSORBERS AND SELECT HINDERED AMINE LIGHT STABILIZERS

CROSS REFERENCE TO RELATED APPLICATIONS

This application is a U.S. National Phase Application under 35 U.S.C. § 371 of International Application No. PCT/US2015/06825, filed on Dec. 31, 2015, which claims the benefit of U.S. Provisional Patent Application No. 62/098,908, filed on Dec. 31, 2014. The entire contents of each are incorporated herein by reference in their entirety.

FIELD

The present technology is generally related to stabilized candle wax compositions and a method for the stabilization of color (dyes or pigments) in candle wax compositions.

BACKGROUND

Candles have been known for many centuries going back to the eighth century B.C. The nature of candles is described in Ullmann's Encyclopedia of Industrial Chemistry, Volume A5 at pages 29-30 where it is seen that candles are made from paraffin, beeswax and stearin as basic materials, and where a host of additives may also be present. It is not surprising that with candles and wax becoming increasingly more important attention was paid as to how to stabilize the said materials.

SUMMARY

In one aspect, a stabilized composition includes candle wax; an ultraviolet light absorber; and a hindered amine light stabilizer of formula (I)

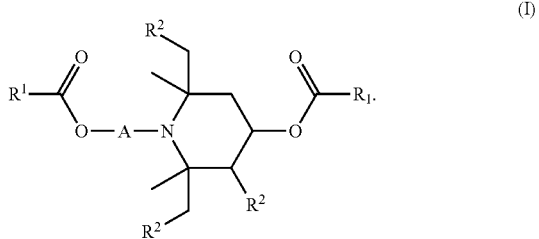

In Formula (I), A is —CH($R^3$)—CH$_2$— or —CH$_2$—CH($R^3$)—; each $R^1$ is $C_1$-$C_{21}$ alkyl; acyclic $C_3$-$C_{21}$ alkenyl having 1, 2, or 3 double bonds; or $C_3$-$C_7$ cycloalkyl; $R^2$ is H or $C_1$-$C_3$ alkyl; $R^3$ is H or $C_1$-$C_4$ alkyl; and $R^4$ is $C_1$-$C_4$ alkyl.

In another aspect, a method of stabilizing candle wax is provided, the method including adding to a candle wax material an effective stabilizing amount of an ultraviolet light absorber; and a hindered amine light stabilizer of formula (I)

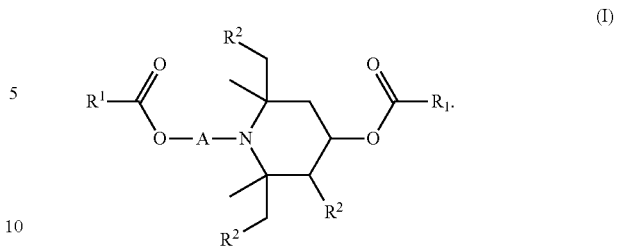

In Formula (I), A is —CH($R^3$)—CH$_2$— or —CH$_2$—CH($R^3$)—; each $R^1$ is $C_1$-$C_{21}$ alkyl; acyclic $C_3$-$C_{21}$ alkenyl having 1, 2, or 3 double bonds; or $C_3$-$C_7$ cycloalkyl; $R^2$ is H or $C_1$-$C_3$ alkyl; $R^3$ is H or $C_1$-$C_4$ alkyl; and $R^4$ is $C_1$-$C_4$ alkyl.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, the term "substituted," unless specifically defined differently, refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. For some groups, substituted may provide for attachment of an alkyl group to another defined group, such as a cycloalkyl group.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, isobutyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group. In general, alkyl groups may include in addition to those listed above, but are not limited to, 2-pentyl, 2-methylbutyl, 3-methylbutyl, 1,2-dimethylpropyl, 1,1-dimethylpropyl, 2,2-dimethylpropyl, 1-ethylpropyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, 2-heptyl, 3-heptyl, 2-ethylpentyl, 1-propylbutyl, 2-ethylhexyl, 2-propylheptyl, 1,1,3,3-tetramethylbutyl, nonyl, decyl, n-undecyl, n-dodecyl, n-tridecyl, iso-tridecyl, n-tetradecyl, n-hexadecyl, n-octadecyl, n-eicosyl, and the like.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

The present inventors have discovered new materials and compositions that stabilize candle waxes with respect to yellowing, color fading in the case of dyed or pigmented candles, and other degradation of the waxes. The materials and compositions may be used in a wide variety of a candle waxes including, but not limited to, paraffin, beeswax, natural oils, polyamide plus fatty acids and esters thereof, fatty acids such as stearin, opacifiers, glycerides plus oxidized wax, alcohols, and ethylene oligomers.

In one aspect, a candle wax composition is provided, the composition being stabilized with a combination of a UV absorber and a hindered amine light stabilizer. The compositions may include metals or metal compounds. Any of the above compositions may include other additives, such as antioxidants.

Stabilized was compositions include the candle wax, an ultraviolet light ("UV") absorber, and a hindered amine light stabilizer. The hindered amine light stabilizers are compounds of Formula (I):

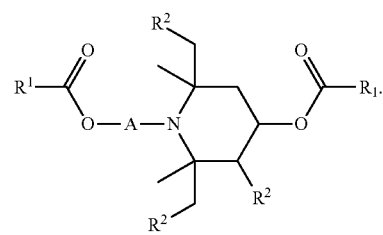

(I)

In the compound of Formula (I), A is a group of formula —$CH(R^3)$—$CH_2$— or —$CH_2$—$CH(R^3)$—. Further, each $R^1$ is individually a $C_1$-$C_{21}$ alkyl, acyclic $C_3$-$C_{21}$ alkenyl having 1, 2, or 3 double bonds, or $C_3$-$C_7$ cycloalkyl. In some embodiments, $R^1$ is a substituted $C_1$-$C_{21}$ alkyl where the substituent is $OR^5$ or CN, wherein $R^5$ is H, methyl, ethyl, n-propyl, iso-propyl, n-butyl, sec-butyl, or tert-butyl (i.e. a $C_1$-$C_4$ alkyl). In some embodiments, $R^1$ is a substituted $C_3$-$C_7$ cycloalkyl, wherein the substituent is methyl, ethyl, n-propyl, iso-propyl, n-butyl, sec-butyl, tert-butyl, $OR^5$, or CN, wherein $R^5$ is H, methyl, ethyl, n-propyl, iso-propyl, n-butyl, sec-butyl, or tert-butyl (i.e. a $C_1$-$C_4$ alkyl). In some embodiments, $R^1$ is $C_4$-$C_{21}$ alkyl substituted with —$COR^4$ or —$C(O)R^4$ where $R^4$ is methyl, ethyl, n-propyl, iso-propyl, n-butyl, sec-butyl, or tert-butyl (i.e. a $C_1$-$C_4$ alkyl). In any of the above embodiments, all $R^1$ groups in a compound of Formula (I) are the same.

In various embodiments, in the compound of Formula (I), $R^1$ may be $C_1$-$C_{17}$ alkyl, a $C_1$-$C_{12}$ alkyl, or a $C_3$-$C_7$ cycloalkyl. In any of the above embodiments, $R^1$ may be a branched alkyl. In any of the above embodiments, $R^1$ may be methyl, ethyl, n-propyl, isopropyl, tert-butyl, n-pentyl, 1-ethylpentyl, 1,13,3-tetramethylbutyl, 2,4,4-trimethylpentyl, 1-propylhexyl, n-undecyl, n-tridecyl, n-pentadecyl, n-heptadecyl, cyclopentyl, cyclohexyl, 2-methoxyethyl, methoxymethyl, or acetoethyl. In some embodiments, $R^1$ is 1-ethylpentyl, 2,4,4-trimethylpentyl, or 1-propylhexyl. In some embodiments, $R^1$ is a $C_1$-$C_{21}$ alkyl substituted with at least one substituent selected from $C_1$-$C_4$ alkoxy and OH.

In the compound of Formula (I), $R^2$ is methyl, ethyl, n-propyl, or iso-propyl (i.e. a $C_1$-$C_3$ alkyl). In the compound of Formula (I), $R^3$ is H, methyl, ethyl, n-propyl, iso-propyl, n-butyl, sec-butyl, or tert-butyl (i.e. a $C_1$-$C_4$ alkyl). In any of the above embodiments, $R^2$ may be H, methyl, ethyl, n-propyl, or iso-propyl. In some embodiments, $R^2$ is H.

In the compound of Formula (I), A may be —$CH_2$—$CH_2$—, —$CH(CH_3)$—$CH_2$—, —$CH_2$—$CH(CH_3)$—, —$CH_2$—$CH(CH_2$—$CH_3)$—, —$CH(CH_2$—$CH_3)$—$CH_2$—, —$CH_2$—$CH(CH_2$—$CH_2$—$CH_3)$—, —$CH(CH_2$—$CH_2$—$CH_3)$—$CH_2$—, —$CH_2$—$CH(CH_2$—$CH_2$—$CH_2$—$CH_3)$, or —$CH_2$—$CH(CH_2$—$CH_2$—$CH_2$—$CH_3)$. In some embodiments, A is —$CH_2$—$CH_2$—, —$CH(CH_3)$—$CH_2$—, or —$CH_2$—$CH(CH_3)$—. In some embodiments, A is —$CH_2$—$CH_2$— or ~$CH(CH_3)$—$CH_2$—, where the "~" end is attached to the carbonyl carbon. In yet other embodiments, A is —$CH_2$—$CH_2$—.

In yet another embodiment, in the compound of Formula (I), both $R^1$ groups are the same and are methyl, ethyl, isopropyl, tert-butyl, n-pentyl, 1-ethylpentyl, 1,13,3-tetramethylbutyl, 2,4,4-trimethylpentyl, 1-propylhexyl, n-undecyl, n-tridecyl, n-pentadecyl, n-heptadecyl, cyclopentyl, cyclohexyl, 2-methoxyethyl, methoxymethyl, or acetoethyl; $R^2$ is H; and A is —$CH_2$—$CH_2$— or ~$CH(CH_3)$—$CH_2$—.

A stabilized candle wax composition may include the hindered amine light stabilizer of Formula (I), where each $R^1$ is $C_1$-$C_{21}$ alkyl or $C_3$-$C_7$ cycloalkyl. For example, $R^1$ may be $C_1$-$C_{17}$ alkyl, or $C_3$-$C_{12}$ alkyl, or $C_3$-$C_6$ cycloalkyl.

A stabilized candle wax composition may include the hindered amine light stabilizer of Formula (I), where each $R^1$ is $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, or $C_{17}$ alkyl.

A stabilized candle wax composition may include the hindered amine light stabilizer of Formula (I), where each $R^1$ is $C_1$-$C_{21}$ alkyl substituted with at least one substituent selected from $C_1$-$C_4$ alkoxy and —OH.

A stabilized candle wax composition may include the hindered amine light stabilizer of Formula (I), where $R^2$ is H.

A stabilized candle wax composition may include the hindered amine light stabilizer of Formula (I), where A is —$CH_2$—$CH_2$—, —$CH(CH_3)$—$CH_2$—, or —$CH_2$—$CH(CH_3)$—. For example, A may be —$CH_2$—$CH_2$—.

A stabilized candle wax composition may include as the hindered amine light stabilizer of Formula (I), any of the following:

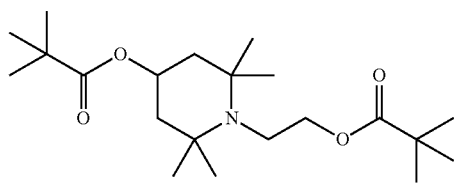

(1)

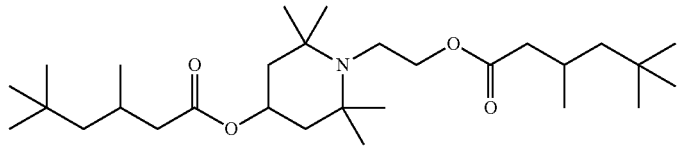

(2)

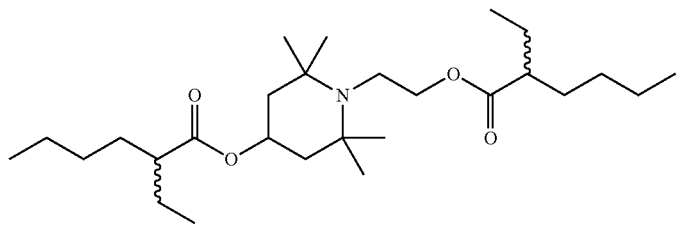

(3)

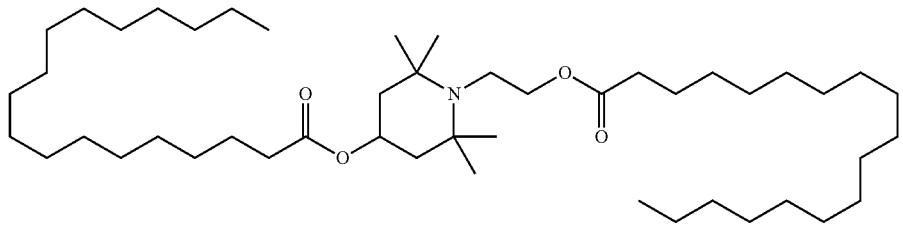

(4)

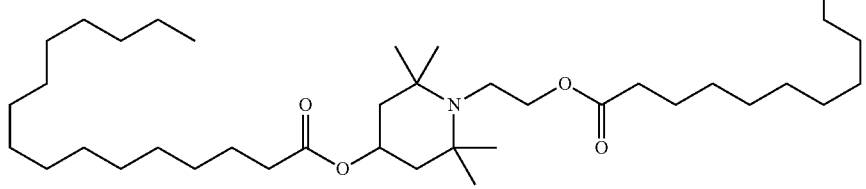

(5)

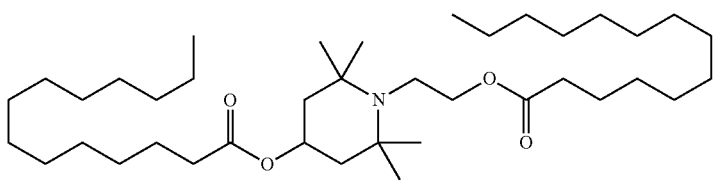
(6)

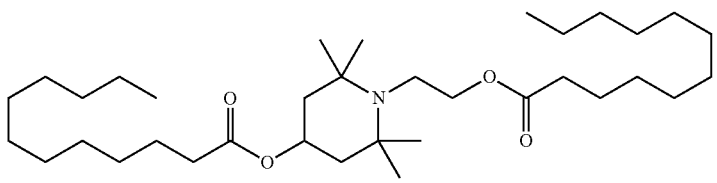
(7)

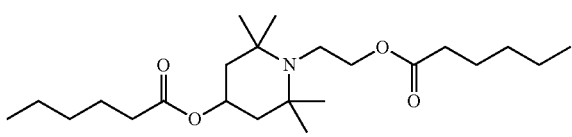
(8)

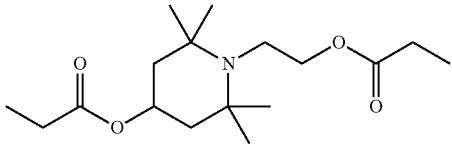
(9)

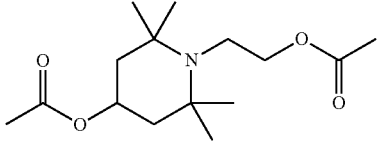
(10)

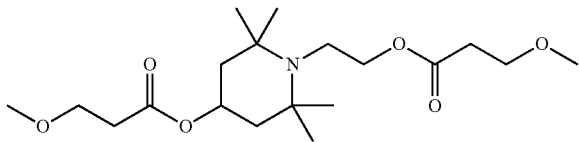
(11)

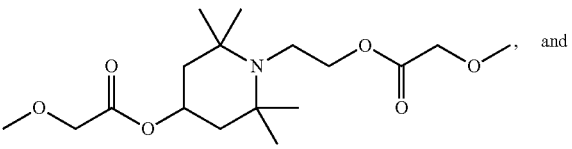
(12)

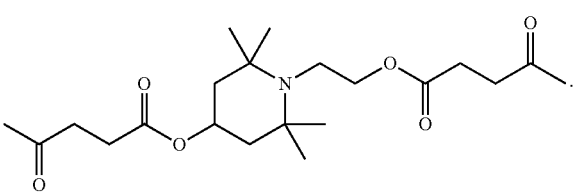
(13)

Any of the above hindered amine light stabilizers may be used either singly in the composition, or as a mixture of any two or more thereof.

As noted above, the candle wax compositions contain a UV absorber. Suitable UV absorbers may include, but are not limited to, benzotriazoles, benzophenones, α-cyanoacrylates, oxanilides, s-triazines, cinnamates, malonates, benzoates, salicylates, and benzoxazin-4-ones. In some embodiments, the UV absorber is a benzotriazole, a benzophenone, or an s-triazine. In some embodiments, the UV absorber is a benzotriazole. Illustrative UV absorbers include, but are not limited to, 4-octyloxy-2-hydroxy-benzophenone; 4-methoxy-2-hydroxy-benzophenone; 2-(2-hydroxy-5-methylphenyl)-2H-benzotriazole; 2-(2-hydroxy-5-tert-octylphenyl-2H-benzotriazole; 2-(2-hydroxy-3,5-di-tert-amyl-phenyl)-2H-benzotriazole; octyl 3-(benzotriazol-2-yl)-5- tert-butyl-4-hydroxyhydrocinnamate; 2-(2-hydroxy-3,5-di-tert-butylphenyl)-2H-benzotriazole; 2-(2-hydroxy-5-tert-butylphenyl)-2H-benzotriazole; 5-chloro-2-(2-hydroxy-3,5-di-tert-butylphenyl)-2H-benzotriazole; 5-chloro-2-(2-hydroxy-3-tert-butyl-5-methylphenyl)-2H-benzotriazole; 2-(2-hydroxy-3-sec-butyl-5-tert-butylphenyl)-2H-benzotriazole; 2-(2-hydroxy-4-octyloxyphenyl)-2H-benzotriazole; 2-(2-hydroxy-3-dodecyl-5-methylphenyl)-2H-benzotriazole; 2-[2-hydroxy-3,5-di(α,α-dimethylbenzyl)phenyl]-2H-benzotriazole; 2-[2-hydroxy-3-(α,α-dimethylbenzyl)-5-tert-octylphenyl]-2H-benzotriazole; 2-{2-hydroxy-3-tert-butyl-5-[2-(Ω-hydroxy-octa(ethyleneoxy)carbonyl)ethyl]phenyl}-2H-benzotriazole; 2-{2-hydroxy-3-tert-butyl-5-[2-(octyloxy)carbonyl)ethyl]phenyl}-2H-benzotriazole; 2-ethylhexyl p-methoxycinnamate; 4-methoxy-2,2'-dihydroxybenzophenone; 4,4'-dimethoxy-2,2'-dihydroxybenzophenone; 2,4-bis(2,4-dimethylphenyl)-6-(2-hydroxy-4-octyloxyphenyl)-s-triazine; 2,4-diphenyl-6-(2-hydroxy-4-hexyloxyphenyl)-s-triazine; 2,4-bis(2,4-dimethylphenyl)-6-[2-hydroxy-4-(3-do-tri-decyloxy-2-hydroxypropoxy)phenyl]-s-triazine; and 2,4-bis(2,4-dimethylphenyl)-6-[2-hydroxy-4-(3-do-tri-decyloxy-2-hydroxypropoxy)-5-α-cumyl-phenyl]-s-triazine, or a mixture of any two or more thereof.

In some embodiments, the UV absorbers is 4-octyloxy-2-hydroxybenzophenone; 4-methoxy-2-hydroxybenzophenone; 2-(2-hydroxy-5-tert-octylphenyl-2H-benzotriazole; 2-[2-hydroxy-3-(α,α-dimethylbenzyl)-5-tert-octylphenyl]-2H-benzotriazole; 2-{2-hydroxy-3-tert-butyl-5-[2-(Ω-hydroxy-octa(ethyleneoxy)-carbonyl)ethyl]phenyl}-2H-benzotriazole; and 2-{2-hydroxy-3-tert-butyl-5-[2-(octyloxy)carbonyl)ethyl]phenyl}-2H-benzotriazole, or a mixture of any two or more thereof.

The stabilized candle wax composition may further include a metal or a metal compound, where the metal is selected from groups 2, 4, 5, 6, 7, 8, 9, 10, 11, 12, 13, 14, 15, and 16 of the periodic table. Illustrative metals that may be used include, but are not limited to, Mg, Ca, Ti, V, Mo, W, Mn, Fe, Rh, Ni, Pt, Pd, Cu, Zn, Al, Si, Ge, Sn, or Bi. In some embodiments, the metal is Mg, Ca, Ti, Mo, W, Mn, Fe, Pt, Pd, Cu, Zn, Al, Si, Sn, or Bi. In other embodiments, the metal is Mg, Ca, Ti, Mn, Fe, Cu, Zn, Al, Si, or Sn. ON some embodiments, the metal is Fe or Sn.

Where the metal is part of a metal compound, the metal compound may be a metal complex, a metal salt, an organometallic compound such as a metal carboxylate or metal alkoxide, a metal salt, or the pure metal.

Where a metal, or metal compound, is used in the candle wax composition, the metal may be present from about 1 ppb (part per billion) to about 3400 ppm (parts per million), based on the weight of the candle wax. This may include amounts from about 1 ppb to about 3.4 ppm, and from about 15 ppb to about 600 ppb. The levels of metal discussed are based on metal alone (on the metal itself) relative to candle wax.

The candle wax compositions may further include additional, i.e. a second, hindered amine light stabilizers ("HALS"). In particular, the present compositions may comprise at least one further hindered amine stabilizer that is a hindered amine substituted on the N-atom by an alkoxy or cycloalkoxy moiety, a hindered amine substituted on the N-atom by an alkoxy which is further substituted with an hydroxy group, and conventional hindered amines where the N-atom is substituted by hydrogen, alkyl, acyl, and the like. Illustrative second HALS include, but are not limited to, N-alkoxy or cyclohexyloxy substituted hindered amines, N-hydroxy-alkoxy substituted hindered amines; and conventional hindered amines where the N-atom is substituted by hydrogen, alkyl or acyl. Hindered amines substituted on the N-atom by an alkoxy or a cycloalkoxy moiety are such as those described in U.S. Pat. No. 5,204,473. Illustrative second HALS include, but are not limited to, bis(1-octyloxy-2,2,6,6-tetramethylpiperidin-4-yl) sebacate bis(1-cyclohexyloxy-2,2,6,6-tetramethylpiperidin-4-yl) sebacate; 1-cyclohexyloxy-2,2,6,6-tetramethyl-4-octadecylaminopiperidine; 2,4-bis[(1-cyclohexyloxy-2,2,6,6-tetramethylpiperidin-4-yl)butylamino]-6-(2-hydroxyethylamino-s-triazine; bis(1-cyclohexyloxy-2,2,6,6-tetramethylpiperidin-4-yl) adipate; an oligomeric compound which is the condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine; an oligomeric compound which is the condensation product of 4,4'-hexamethylene-bis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; 1-methoxy-4-hydroxy-2,2,6,6-tetramethylpiperidine; 1-octyloxy-4-hydroxy-2,2,6,6-tetramethylpiperidine; 1-cyclohexyloxy-4-hydroxy-2,2,6,6-tetramethylpiperidine; 1-methoxy-4-oxo-2,2,6,6-tetramethylpiperidine; 1-octyloxy-4-oxo-2,2,6,6-tetramethylpiperidine; 1-cyclohexyloxy-4-oxo-2,2,6,6-tetramethylpiperidine, bis(1-heptyloxy-2,2,6,6-tetramethylpiperidin-4-yl) sebacate; bis(1-nonyloxy-2,2,6,6-tetramethylpiperidin-4-yl) sebacate; bis(1-dodecyloxy-2,2,6,6-tetramethylpiperidin-4-yl) sebacate, and N,N',N",N"'-tetrakis[(4,6-bis(butyl-1-octyloxy-2,2,6,6-pentamethylpiperidin-4-yl)-amino-s-triazin-2-yl]-1,10-diamino-4,7-diazadecane.

The hindered amines substituted on the N-atom by a hydroxy-substituted alkoxy group are disclosed in U.S. Pat. No. 6,271,377. Illustrative second HALS of this type include, but are not limited to 1-(2-hydroxy-2-methylpropoxy)-4-octadecanoyloxy-2,2,6,6-tetramethylpiperidine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; bis(1-(2-hydroxy-2-methylpropoxy)-2,2,6,6-tetramethylpiperidin-4-yl) succinate; bis(1-(2-hydroxy-2-methylpropoxy)-2,2,6,6-tetramethylpiperidin-4-yl) glutarate; and 2,4-bis{N-[1-(2-hydroxy-2-methylpropoxy)-2,2,6,6-tetramethylpiperidin-4-yl]-N-butylmino}-6-(2-hydroxyethylamino)-s-triazine.

Conventional hindered amines that may be used as the second HALS include, but are not limited to, bis(2,2,6,6-tetramethylpiperidin-4-yl) sebacate; bis(1,2,2,6,6-pentamethylpiperidin-4-yl) sebacate; di(1,2,2,6,6-pentamethylpiperidin-4-yl) (3,5-di-tert-butyl-4-hydroxybenzyl) butylmalonate; 4-benzoyl-2,2,6,6-tetramethylpiperidine; 4-stearyloxy-2,2,6,6-tetramethylpiperidine; tris(2,2,6,6-tetramethylpiperidin-4-yl) nitrilotriacetate; a polycondensation product of 2,4-dichloro-6-tert-octylamino-s-triazine and 4,4'-hexamethylenebis(amino-2,2,6,6-tetramethylpiperidine); a polycondensation product of 1-(2-hydroxyethyl)-2,2,6,6-tetramethyl-4-hydroxypiperidine and succinic acid; a polycondensation product of 4,4'-hexamethylenebis-(amino-2,2,6,6-tetramethylpiperidine) and 1,2-dibromoethane; tetrakis(2,2,6,6-tetramethylpiperidin-4-yl)-1,2,3,4-butanetetracarboxylate; tetrakis(1,2,2,6,6-pentamethylpiperidin-4-yl)-1,2,3,4-butanetetracarboxylate;

a polycondensation product of 2,4-dichloro-6-morpholino-s-triazine and 4,4'-hexamethylene-bis(amino-2,2,6,6-tetramethylpiperidine); N,N',N'',N'''-tetrakis[(4,6-bis(butyl-1,2,2,6,6-pentamethylpiperidin-4-yl)-amino-s-triazin-2-yl]-1,10-diamino-4,7-diazapdecane; octamethylene bis(2,2,6,6-tetramethylpiperidin-4-carboxylate); N-2,2,6,6-tetramethylpiperidin-4-yl-n-dodecylsuccinimide; N-1,2,2,6,6-pentamethylpiperidin-4-yl-n-dodecylsuccinimide; N-1-acetyl-2,2,6,6-tetramethylpiperidin-4-yl-n-dodecylsuccinimide; 4-$C_{15}$-$C_{17}$ alkanoyloxy-2,2,6,6-tetramethylpiperidine; a polycondensation product of 2,4-dichloro-6-cyclohexylamino-s-triazine and 4,4'-hexamethylene-bis(amino-2,2,6,6-tetramethylpiperidine); 1,5-bis(2,2,6,6-tetramethylpiperidin-4-yl)-1,5-diaza-4-oxo-propane; a copolymer of methyl methracrylate, ethyl acrylate and 2,2,6,6-tetramethylpiperidin-4-yl acrylate; a copolymer of N-octadecylmaleimide, styrene and N-(2,2,6,6-tetramethylpiperidin-4-yl)maleimide; 1,3,5-tris[3-(2,2,6,6-piperidin-4-yl-amino)-2-hydroxy-propyl) isocyanurate; a olefin copolymer containing units derived from N-[2-(2,2,6,6-tetramethylpiperidin-4-yl)oxalamid-1-yl]maleimide; 2,2,4,4-tetramethyl-7-oxa-3,20-diaza-21-oxo-dispiro-[5,1,11,2]-heneicosane; $C_{12}$-$C_{14}$ alkyl 3-(2,2,4,4-tetramethyl-7-oxa-3,20-diaza-21-oxo-dispiro-[5,1,11,2]heneicosane-20-yl)propionate; a reaction product of epichlorohydrin and 2,2,4,4-tetramethyl-7-oxa-3,20-diaza-21-oxo-dispiro-[5,1,11,2]-heneicosine; 1,3-di(2,2,6,6-tetramethylpiperidin-4-yl)-2,4-ditridecylbutane tetracarboxylate; 1,3-di(1,2,2,6,6-pentamethylpiperidin-4-yl)-2,4-ditridecylbutane tetracarboxylate; a polycondensation product of 3,9-bis(1,1-dimethyl-2-hydroxyethyl)-2,4,8,10-tetraoxaspiro-[5.5]-undecane, tetramethyl 1,2,3,4-butanetetra-carboxylate and 2,2,6,6-tetramethyl-4-hydroxypiperidine; a polycondensation product of 3,9-bis(1,1-dimethyl-2-hydroxyethyl)-2,4,8,10-tetraoxaspiro-[5.5]-undecane, tetramethyl 1,2,3,4-butanetetra-carboxylate and 1,2,2, 6,6-pentamethyl-4-hydroxypiperidine; 1,4-bis(2,2,6,6-tetramethylpiperidin-4-yl)-2,2-dimethyl-1,4-diaza-4-oxo-propane; a reaction product of 4-amino-2,2,6,6-tetramethylpiperidine and tetramethylol-acetylenediurea; 1,6-hexamethylenebis[N-formyl-N-(2,2,6,6-tetramethylpiperidin-4-yl)amine]; copolymer of N-(2,2,6,6-tetramethylpiperdin-4-yl)maleimide and a $C_{20}$-$C_{24}$-α-olefin; poly[3-(2,2,6,6-tetramethylpiperidin-4-yloxy)propyl-methyl-siloxane]; a polycondensation product of 2,4-dichloro-6-[N-butyl-N-(2,2,6,6-tetramethyl-piperidin-4-yl)amino]-s-triazine and 1,10-diamino-4,7-diazadecane; and dodecyl 3-(2,2,4,4-tetramethyl-7-oxa-3,20-diaza-21-oxo-dispiro-[5,1,11,2]-heneicosane-20-yl) propionate. In some embodiments, the conventional second hindered amine is bis(2,2,6,6-tetramethylpiperidin-4-yl) sebacate; bis(1,2,2,6,6-pentamethylpiperidin-4-yl) sebacate; di(1,2,2,6,6-pentamethylpiperidin-4-yl) (3,5-di-tert-butyl-4-hydroxybenzyl)butylmalonate; a polycondensation product of 2,4-dichloro-6-tert-octylamino-s-triazine and 4,4'-hexamethylenebis(amino-2,2,6,6-tetramethylpiperidine); a polycondensation product of 1-(2-hydroxyethyl)-2,2,6,6-tetramethyl-4-hydroxypiperidine and succinic acid; or N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

It is also contemplated that mixtures of the N-alkoxy or cyclohexyloxy substituted hindered amines; mixtures of the N-hydroxy-alkoxy substituted hindered amines; and mixtures of these two types of hindered amines may be used. Indeed, mixtures of these types of hindered amines along with conventional hindered amines where the N-atom is substituted by hydrogen, alkyl, acyl and the like are also contemplated as being useful in this invention.

The stabilized candle wax compositions may also include a phenolic antioxidant, an organic phosphorus stabilizer, a hydroxylamine stabilizer, a nitrone stabilizer, or an amine oxide stabilizer, or a mixture of any two or more thereof. Illustrative hydroxylamine stabilizers are disclosed in U.S. Pat. Nos. 4,590,231; 4,612,393; 4,649,221; 4,668,721; 4,691,015; 4,696,964; 4,703,073; 4,720,517; 4,757,102; 4,782,105; 4,831,134; 4,876,300; 5,006,577; 5,019,285; 5,064,883; 5,185,448; and 5,235,056. Illustrative nitrone stabilizers are described in U.S. Pat. No. 4,898,901. An illustrative amine oxide stabilizer is Genox™ EP, a di($C_{16}$-$C_{18}$)alkyl methyl amine oxide. Illustrative hydroxylamine stabilizers include those as described in U.S. Pat. Nos. 4,666,962; 4,666,963; 4,678,826; 4,753,972; 4,757,102; 4,760,179; 4,929,657; 5,057,563; 5,021,479; 5,045,583; and 5,185,448. Illustrative saturated hydrocarbon amine oxide stabilizers are described in U.S. Pat. Nos. 5,081,300; 5,162,408; 5,844,029; 5,880,191; and 5,922,794.

Illustrative phenolic antioxidants and hydroxylamines include, but are not limited to, n-octadecyl-3,5-di-tert-butyl-4-hydroxyhydrocinnamate; neopentanetetrayl tetrakis(3,5-di-tert-butyl-4-hydroxyhydrocinnammate); di-n-octadecyl-3,5-di-tert-butyl-4-hydroxybenzylphosphonate; 1,3,5-tris(3,5-di-tert-butyl-4-hydroxybenzyl)isocyanurate; thiodiethylene bis(3,5-di-tert-butyl-4-hydroxyhydrocinnamate); 1,3,5-trimethyl-2,4,6-tris(3,5-di-tert-butyl-4-hydroxybenzyl)benzene; 3,6-dioxaoctamethylene bis(3-methyl-5-tert-butyl-4-hydroxyhydrocinnamate); 2,6-di-tert-butyl-p-cresol; 2,2'-ethylidene-bis(4,6-di-tert-butylphenol); 1,3,5-tris(2,6-dimethyl-4-tert-butyl-3-hydroxybenzyl) isocyanurate; 1,1,3,-tris(2-methyl-4-hydroxy-5-tert-butylphenyl)butane; 1,3,5-tris[2-(3,5-di-tert-butyl-4-hydroxyhydrocinnamoyloxy)ethyl] isocyanurate; 3,5-di-(3,5-di-tert-butyl-4-hydroxybenzyl) mesitol; hexamethylene bis(3,5-di-tert-butyl-4-hydroxyhydrocinnamate); 1-(3,5-di-tert-butyl-4-hydroxyanilino)-3,5-di(octylthio)-s-triazine; N,N'-hexamethylene-bis(3,5-di-tert-butyl-4-hydroxyhydrocinnamamide); calcium bis(ethyl 3,5-di-tert-butyl-4-hydroxybenzylphosphonate); ethylene bis[3,3-di(3-tert-butyl-4-hydroxyphenyl)butyrate]; octyl 3,5-di-tert-butyl-4-hydroxybenzylmercaptoacetate; bis(3,5-di-tert-butyl-4-hydroxyhydrocinnamoyl)hydrazide; N,N'-bis[2-(3,5-di-tert-butyl-4-hydroxyhydrocinnamoyloxy)-ethyl] oxamide; benzenepropanoic acid, 3,5-bis (1,1-dimethylethyl)-4-hydroxy-C7-C9-branched alkyl esters; N,N-di($C_{16}$-$C_{18}$alkyl)hydroxylamine; and a di($C_{16}$-$C_{18}$)alkyl methyl amine oxide. In some embodiments, a phenolic antioxidant in the candle wax composition is neopentanetetrayl tetrakis (3,5-di-tert-butyl-4-hydroxyhydrocinnamate); n-octadecyl 3,5-di-tert-butyl-4-hydroxyhydrocinnamate; 1,3,5-trimethyl-2,4,6-tris(3,5-di-tert-butyl-4-hydroxybenzyl)benzene; 1,3,5-tris(3,5-di-tert-butyl-4-hydroxybenzyl)isocyanurate; 2,6-di-tert-butyl-p-cresol; benzenepropanoic acid; 3,5-bis (1,1-dimethyl-ethyl)-4-hydroxy-C7-C9-branched alkyl esters, or 2,2'-ethylidene-bis(4,6-di-tert-butylphenol).

The amount of the UV absorber and the hindered amine light stabilizer, along with any second HALS, or other additives, in the candle wax compositions should be an effective amount such that degradation of the candle wax is minimized or substantially eliminated. For example, the effective amount may be from about 0.001 wt % to about 10 wt % based on the wax. This may include, from about 0.01 wt % to about 2 wt %, or from about 0.1 wt % to about 0.5 wt %, based on the wax.

Candles may also contain a number of additives such as, but not limited to, mold release agents, fragrances, insect repellants or insecticides, hardeners, crystal modifiers, clarifiers, guttering reducers, colorants, f.p. control agents, stretchability improvers, gelling agents, extrusion aids, and vortex reducers. Each of the various components are meant to control or modify the properties of the candle to insure proper burning, reduce channeling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a co-polymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or co-monomer units. The most common structure found in KRATON® D series is a linear ABA block with styrene-butadiene-styrene (SBS) or styrene-isoprene-styrene (SIS).

In another aspect, a method of stabilizing candle wax is provided. The method includes adding to a candle wax composition an effective stabilizing amount of a UV absorber, as described above; and an effective amount of a hindered amine light stabilizer that is a compound of Formula (I), as described above. The method may also include adding a second hindered amine light stabilizers (HALS or hindered amines) to the candle wax composition. In some embodiments, the method includes adding an additional stabilizer selected from the group consisting of the phenolic antioxidants, organic phosphorus stabilizers, hydroxylamine stabilizers, nitrone stabilizers and amine oxide stabilizers, as described above.

The amount of the UV absorber and the hindered amine light stabilizer, along with any second HALS, or other additives, added to the candle wax compositions should be an effective amount such that degradation of the candle wax is minimized or substantially eliminated. For example, the effective amount may be from about 0.001 wt % to about 10 wt % based on the wax. This may include, from about 0.01 wt % to about 2 wt %, or from about 0.1 wt % to about 0.5 wt %, based on the wax.

The present invention, thus generally described, will be understood more readily by reference to the following examples, which are provided by way of illustration and are not intended to be limiting of the present invention.

EXAMPLES

Raw Materials

Fully refined wax with a melting point of 137-141° C. and <0.5% oil content is obtained from the Astor Wax Company. Dyes were supplied by French Color and Chemical Corporation. Wax samples were supplied by the Candle-Lite Corporation or Candle Corporation of America. These samples contain dyes and fragrances. Alternatively, the candle samples containing dyes and fragrances, without UV absorbers and/or hindered amine light stabilizers, were obtained from Alene Candles. The UV absorbers and hindered amine stabilizers were obtained from BASF Corporation.

Sample Preparation

The wax samples obtained from the Candle Corporation of America already contain a dye and a fragrance (scent). In these cases, the wax was melted and the appropriate stabilizer(s) is (are) added and dissolved in the molten wax. The stabilized wax was then poured into a mold (7"×8.5"×0.25"; 17.78 cm×21.59 cm×0.635 cm) giving a wax plaque.

To the wax samples obtained from the Astor Wax Company after melting are added 0.001% by weight of the test dyes to give a dyed candle wax base. To the dyed wax base after melting were added the appropriate stabilizer(s). The melted stabilized and dyed wax was then poured into the mold described above to give a wax plaque.

Alternatively, the wax samples obtained from the Candle-Lite Corporation already contain a dye and a fragrance (scent). In these cases, the wax is melted and the appropriate stabilizer(s) were added and dissolved in the molten wax. The stabilized wax was then poured into five (5) 44 mm diameter aluminum pans giving five (5) wax disks.

Alternatively, the wax samples obtained from Alene Candles already contain a dye and a fragrance (scent). In these cases, the wax was melted and the appropriate stabilizer(s) were added and dissolved in the molten wax. The stabilized wax was then poured into five (5) 44 mm diameter aluminum pans giving five (5) wax disks.

Sample Exposure

The wax plaques described above were cut into eight equal pieces (3.5"×2.125"; 8.89 cm×5.40 cm). Triplicate samples of each disk or plaque were exposed under a bank of six (6) cool-white fluorescent lamps (40 watts) or under a bank of six (6) UV lamps having a wavelength of 368 nm with the test samples being twelve (12) inches (30.48 cm) below the lamps. Dye color fade (or color change) was measured by a Macbeth ColorEye Spectrophotometer with a 6 inch integrating sphere. The conditions were: 10 degree observer; D65 illuminant and 8 degree viewing angle.

Initial color measurements were taken using the above parameters. The L, a, and b values were calculated using the CIE system from the reflectance values. YI is calculated from the L, a, and b values. Subsequent measurements are taken at specified intervals. Delta L, a, b, and YI values were simply the difference between the initial values and the values at each interval. Delta (Δ) E is calculated as follows:

$$[(\text{Delta }L)^2+(\text{Delta }a)^2+(\text{Delta }b)^2]^{1/2}=\text{Delta }E.$$

Example 1

2-[4-(2,2-dimethylpropanoyloxy)-2,2,6,6-tetramethyl-1-piperidyl]ethyl 2,2-dimethylpropanoate (Compound 1)

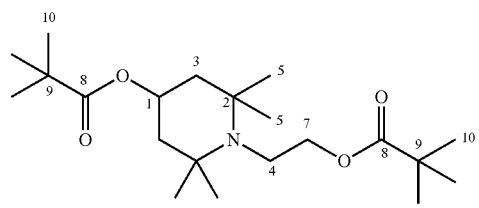 [SMILES: CC(C)(C)C(=O)OCCN1C(C)(C)CC(OC(=O)C(C)(C)C)CC1(C)C]

A three-necked 1 L flask is charged with 53.8 g, (0.27 mol) of 1-(2-Hydroxy-ethyl)-2,2,6,6-tetramethyl-piperidin-4-ol ("HE-HTMP") and THF (100 g; tetrahydrofuran). The flask is then attached to a rotary evaporator, and 30 ml of THF (and—if present—any water) is distilled off at normal pressure. Then the flask is disconnected from the rotary evaporator, and pyridine (67.0 g, 0.85 mol) is added to the flask. After cooling to about 30° C., a solution of pivalic acid chloride (68.30 g, 0.57 mol) in THF (40 ml) is added within 15 minutes into the cooled (15-20° C.) flask. A viscous suspension is formed during the addition of the acid chloride. After control for complete conversion of the HE-HTMP, water (4.5 ml) is added and the mixture is stirred for another hour in order to decompose the excess pivalic acid chloride. Then the solvent is removed from the reaction mixture on a rotary evaporator, and the residue is dissolved in dichloromethane (300 ml). This solution is washed with diluted hydrogen chloride (40 g of a 8% solution), diluted sodium hydroxide (260 g of a 1% solution) and water (250 g). After drying ($Na_2SO_4$), the solvent is removed on the rotary evaporator to leave the crude product as colorless crystalline residue. This material and the material of a similarly performed batch (from 0.395 mol HE-HTMP) are combined and distilled in vacuum to give 125.8 g of the product (51% yield based on HE-HTMP) as colorless crystals giving the following data: bp=145° C., $9 \times 10^{-3}$ mbar; mp=85° C., $^1$H-NMR ($CDCl_3$, 400 MHz), δ 1.06, 1.14 (2 s, 6 H each, CH3, H-5, H-5'); 1.15, 1.17 (2 s, 9 H each, CH3, H-10, H-10'); 1.40 ("tr", 2 H, H-3), 1.77 ("dd", 2 H, H-3'); 2.63 ("dd", 2 H, H-6); 3.91 (m, 2 H, H-7); 5.00 ("tr tr", 1 H, H-4), and $^{13}$C-NMR (CDCl3, 100 MHz), δ 22.28, 33.60 C-5, C-5'; 27.06, 27.21 C-10, C-10'; 38.55, 38.64 C-9, C-9'; 41.77 C-6; 45.40 C-3; 55.66 C-2; 66.64 C-7; 67.04 C-4; 178.14, 178.52 C-8, C-8'.

Example 2

3,5,5-Trimethylhexanoic acid 2,2,6,6-tetramethyl-1-[2-(3,5,5-trimethyl-hexanoyloxy)-ethyl]-piperidin-4-yl ester (Compound 2)

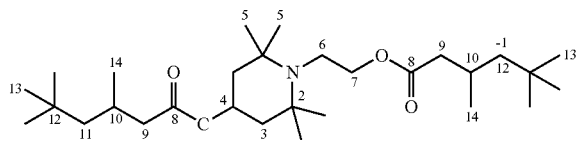 [SMILES: CC(CC(=O)CC1CC(C)(C)N(CCOC(=O)CC(C)CC(C)(C)C)C(C)(C)C1)CC(C)(C)C]

A 250 ml jacketed vessel is fitted with an anchor stirrer, an inner thermometer, a gas inlet tube, a pressure equalized dropping funnel, a Dean-Stark apparatus and a reflux condenser. The outlet from the condenser is connected to a gas absorber in order to trap the hydrogen chloride formed in the reaction. The flask is checked for air-tightness, and then charged with HE-HTMP (50.3 g, 0.25 mol) and xylene isomer mixture (114.9 g). The reservoir of the Dean-Stark apparatus is filled with xylene isomer mixture, and a slow flow of nitrogen (adjusted to about 0.2 L/hour) led through the gas inlet tube into the suspension in the reactor. The mixture is heated at reflux (140° C., mantle temperature 165° C.), and any traces of water are removed via the Dean-Stark apparatus. Then 3,5,5-trimethyl hexanoyl chloride (86.6 g, 0.49 mol) is added at reflux via the dropping funnel in such a rate that the evolution of the formed hydrogen chloride could be controlled. After complete addition of the acid chloride, the initially formed suspension turned into a pale yellow solution which is heated for another hour at reflux and then cooled to 80° C. After washings with water (200 ml), sodium carbonate (twice 50 g of a 10% solution of sodium carbonate in water, twice 100 g of a 5% solution of sodium carbonate in water) the solvent and residual water are removed on the rotary evaporator (initially 100 mbar, 80° C., to finally 0.3 mbar, 80° C.) to leave the product as pale yellow oily liquid (112.0 g, 93% based on hE-HTMP) giving the following data: NMR: HSQC ($CDCl_3$, RT, 400 MHz) δ $^1$H/δ$^{13}$C 1.02, 22.20 (H, C-14); 1.02/22.68, 0.91/22.80 (H,C-5'/H, C-5'); 1.96, 27.03/27.07 (H, C-10/H, C-10'); 0.84/30.01, 30.04 C-13, C-13'; 31.05 (C-12, C-12'); 1.09, 33.79 (H,C-5"/H, C-5'"); 2.61, 41.95 (H, C-6); 2.03, 43.99/2.20, 44.28 (H,C-9/H,C-9'); 1.36, 45.71/1.73, 45.74 (H, C-3/H, C-3'); 1.18, 50.52/1.05, 50.54 (H,C-11/H, C-11'); 55.76 (C-2); 3.88, 66.38 (H,C-7); 5.00, 67.06 (H,C-4); 172.58/172.85 (C-8/C-8').

Example 3

2-Ethyl-hexanoic acid 2-[4-(2-ethyl-hexanoyloxy)-2,2,6,6-tetramethyl-piperidin-1-yl]-ethyl ester (Compound 3)

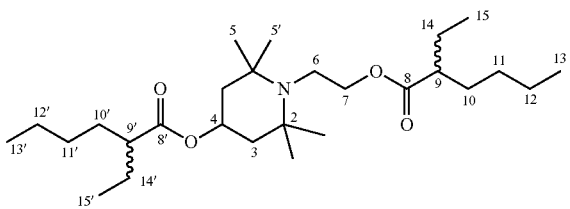

A 250 ml jacketed vessel is fitted with an anchor stirrer, an inner thermometer, a gas inlet tube; a pressure equalized dropping funnel, a Dean-Stark apparatus and a reflux condenser. The outlet from the condenser is connected to a gas absorber in order to trap the hydrogen chloride formed in the reaction. The flask is checked for air-tightness, and then charged with HE-HTMP (45.0 g, 0.224 mol) and a mixture of xylene isomers (132.4 g). The reservoir of the Dean-Stark apparatus is filled with xylene isomer mixture, and a slow flow of nitrogen (adjusted to about 0.2 L/hour) led through the gas inlet tube into the suspension in the reactor. The mixture is heated at reflux (155° C., mantle temperature 165° C.), and about 5 ml of xylene is distilled off to remove any residual traces of water. Then 2-ethyl hexanoyl chloride (72.7 g, 0.447 mol) is added at reflux via the dropping funnel in such a rate that the evolution of the formed hydrogen chloride can be controlled.

After complete addition of the acid chloride, the initially formed suspension turned into a pale yellow solution which is heated for another four hours at reflux and then cooled to 20° C. The solution is washed with sodium carbonate solution (twice 60 g of a 10% solution of sodium carbonate in water), and water (until the pH of the aqueous layer is neutral and no chloride could be detected in the organic layer; eight times 100 g of water). Checking for chloride is done after the seventh and eighth washing as follows: ca. 0.5 g of the organic layer is dissolved in 10 ml glacial acetic and a few drops of a 5% aqueous solution of silver nitrate added. When the mixture remained clear, the organic phase is considered "chloride free"). Then the organic layer is separated, and the xylene removed on the rotary evaporator (initially 100 mbar, 80° C., to finally 30 mbar, 80° C.). The last traces of xylene are removed in high vacuum (170° C., $10^{-3}$ mbar) to leave the product as yellowish oily liquid (83.2 g, 82% yield based on HE-HTMP) giving the following data: NMR: HSQC ($CDCl_3$, RT, 400 MHz) δ $^1$H, δ $^{13}$C 0.84, 11.73/11.78 (H,C-15/C15'); 0.83, 13.85/13.87 (H, C-13/C-13'); 1.04, 22.09 (H, C-5); 1.24, 22.54 (H, C-12/C-12'); 1.44/25.44, 1.54/25.43 (H, C-14/C-14'); 1.20, 29.49/29.59 (H, C-11/C-11'); 1.39/31.70, 1.54,/31.72 (H, C-10/C-10'); 1.11, 33.67 (H, C-5'); 1.37, 1.76/45.64 (H,C-3); 2.62, 41.86 (H, C-6); 2.17, 47.18/47.31 (C-9, C-9'); 55.66 (C-2); 3.92, 66.30 (H, C-7); 5.02, 66.86 (H, C-4); 175.87/176.20 (C-8/C-8').

Example 4

Octadecanoic acid 2-(2,2,6,6-tetramethyl-4-octadecanoyloxy-piperidin-1-yl)-ethyl ester (Compound 4)

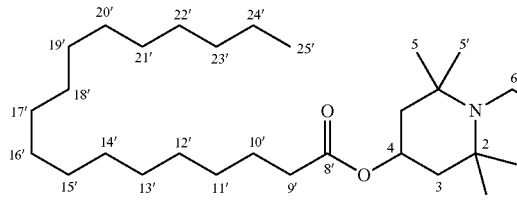

A jacketed 1.5 L flask is fitted with an anchor stirrer, an inner thermometer and a Dean-Stark apparatus with reflux condenser. This flask is charged with xylene (435 g, mixture of isomers) and HE-HTMP (100.6 g, 0.5 mol). The mixture is heated at reflux to remove azeotropically any present water via the Dean-Stark apparatus. Then the temperature is reduced to 100° C., and methyl stearate (316.5 g, 1.03 mol) and tetrabutyl orthotitanate (0.102 g, 0.3 mmol) are added. The mixture is heated at reflux for totally 8 hours (interrupted by 60 h) and then transferred warm into a flask. The solvent is removed on a rotary evaporator, and the remaining melt of the product poured into methanol (about 1 L). After standing over night at ambient temperature the crystallized product is filtered off and washed with methanol (ca. 400 ml). After drying, colorless crystals (218.6 g, 59.5%) are obtained with the following data: $^{13}$C-NMR (APT, CDCl$_3$, 100 MHz, RT) δ 14.07 (C-25, C-25'); 22.13 (C-5); 22.65 (C-24, C-24'); 24.92, 24.97 (C-10, C-10'); 26.09, 29.14, 29.24 (2 C), 29.33 (2 C), 29.43, 29.44, 29.58 (2 C), 29.62 (2 C), 29.63 (2 C), 29.65 (2 C), 29.66-29.68 (8 C), (C10-C22, C-10'-C22'); 31.90 (C-23, C-23'), 33.70 (C-5'), 34.21, 34.61 (C-9, C-9'); 41.89 (C-6); 45.62 (C3); 55.73 (C-2); 66.45 (C-7); 67.10 (C-4); 173.41, 173.68 (C-8, C-8').

Example 5

Hexadecanoic acid 2-(4-hexadecanoyloxy-2,2,6,6-tetramethyl-piperidin-1-yl)-ethyl ester (Compound 5)

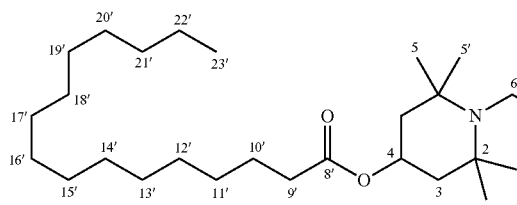

A 250 ml jacketed vessel is fitted with an anchor stirrer, an inner thermometer, a gas inlet tube, a pressure equalized dropping funnel, a Dean-Stark apparatus and a reflux condenser. The flask is charged with HE-HTMP (16.1 g, 80 mmol), Petrol (80 g), ("Petrol" is an aryl free mixture of alkanes with a boiling range from 150-190° C.), and methyl palmitate (42.6 g, 158 mmol). The Dean-Stark apparatus is filled with Petrol (30 g), and then the mixture is heated at reflux (mantle temperature 190° C.) and about 30 ml of petrol is distilled off to remove any residual traces of water. Then the mixture is cooled to 100° C., and aluminium tri-isopropylate (0.32 g, 1.57 mmol, 1 mol %) is added. The mixture is again heated at reflux (mantle temperature 190° C.), and kept stirring for seven hours. Then, a light vacuum is applied to remove the last traces of the formed methanol, and finally the mixture is cooled to ambient temperature. The cooled mixture was dissolved in ethanol (250 ml) and bleached with a bleaching earth for about ten minutes at reflux. After removal of the bleaching earth by filtration, the product crystallized from the filtrate and is filtered off, washed with methanol (about 25 g) and dried to give the product (23.0 g, 44%) as colorless crystals.

Alternatively, the product is prepared according to the following procedure: a 250 ml jacketed vessel is fitted with an anchor stirrer, an inner thermometer and a descending condenser is charged with HE-HTMP (50.1 g, 0.249 mol) and methyl palmitate (134.3 g, 0.497 mol). This mixture is heated to 151° C., and then tetrabutyl orthotitanate (0.14 g, 0.4 mmol) is added. The mixture is kept at 151° C. for 24 hours (GC conversion ca. 99%) and then cooled to 80° C. The contents of the reactor are then added into refluxing methanol (300 g). The obtained emulsion is allowed to cool slowly and seeded when the temperature is at 35° C. A suspension of seed crystals is obtained by taking about 1 ml of the emulsion into a test tube and scratching with a spatula. After cooling to ambient temperature and stirring for another couple of hours, the crystallized product is filtered off, washed with methanol (about 100 ml) and dried on the rotary evaporator (30° C., 6 hours) to give 158.4 g of colorless crystals (94.1% of theory) having the following data: $^1$H-NMR (CDCl$_3$, 400 MHz, RT) δ 0.88, 0.89 (t, 3H each, H-23, H-23'); 1.10, 1.17 (s, 6H each, H-5, H-5'); 1.27

(m, 48H, H-11 to H-22, H11" to H-22'); 1.43, 1.83 (t, dd, 2H each, H-3, H-3'); 1.63 (dq, 2H each, H-11, H-11"); 2.28 (q, 4H, H-9, H-9'); 2.69 (t, 2H, H-6); 3.97 (t, 2H, H-7); 5.08 (m, 1H, H-4); and $^{13}$C-NMR (CDCl$_3$, 100 MHz, RT,) δ 14.11 C23, C-23'; 22.17, 33.74 C-5, C-5'; 22.69 C-22, C-22'; 24.96, 25.01 C-10, C-10'; 29.12-29.69 C-11 to C-22, C-11' to C-22'; 31.93 C-21, C-21'; 34.27, 34.67 C-9, C-9'; 41.91 C-6; 45.64 C-3; 55.77 C-2; 66.49 C-7; 67.17 C-4.

Example 6

Tetradecanoic acid 2-(2,2,6,6-tetra-methyl-4-tetradecanoyloxy-piperidin-1-yl)-ethyl ester (Compound 6)

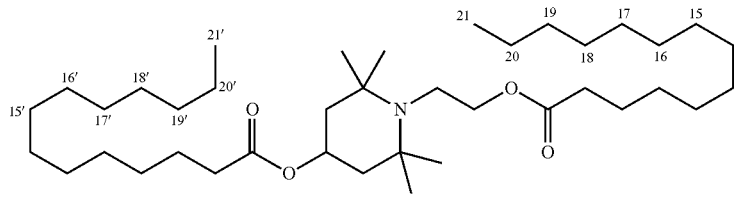 [SMILES: CCCCCCCCCCCCCC(=O)OCCN1C(C)(C)CC(OC(=O)CCCCCCCCCCCCC)CC1(C)C]

A jacketed 250 ml flask is fitted with an anchor stirrer, inner thermometer, gas inlet tube and a Dean-Stark apparatus with reflux condenser. The flask is charged with HE-HTMP (17.1 g, 84 mmol), Petrol (80 g), ("Petrol" is defined above), and methyl laurate (42.4 g, 171 mmol). The mixture is heated at reflux (mantle temperature 200° C.), and any residual water is removed via the Dean-Stark apparatus. Then the temperature is reduced (mantle temperature 80° C.), and aluminium tri-isopropylate (0.37 g, 1.8 mmol) is added. Then the mixture is again heated at reflux (mantle temperature=190° C.) for four hours and then the solvent is removed at slightly reduced pressure (800 mbar) within four hours. The remaining molten product (57.4 g) was a brownish oily liquid which solidified on standing, melting point=42-44° C.

The product can be prepared also as follows: a 250 ml jacketed vessel is fitted with an anchor stirrer, an inner thermometer and a descending condenser is charged with HE-HTMP (30.6 g, 0.15 mol) and methyl tetradecanoate (80.9 g, 0.33 mol). This mixture is heated and at an inner temperature of 143° C. tetrabutyl orthotitanate (0.178 g, 0.052 mmol) is added. The mantel temperature is set to 180° C. and mixture is kept stirring for 23 hours, after the inner temperature reached 148° C. A gas chromatographic analysis showed about 94% conversion. The mixture is cooled to 80° C. and then added into refluxing methanol (300 g). The obtained emulsion is allowed to cool slowly and seeded when the temperature is at 35° C. A suspension of seed crystals is obtained by taking about 1 ml of the emulsion into a test tube and scratching with a spatula. After cooling to ambient temperature and stirring for another couple of hours, the crystallized product is filtered off, washed with methanol (about 100 ml) and dried on the rotary evaporator (30° C., 23 mbar, 4 hours) to give 89.8 g (96.2% based on HE-HTMP) of colorless crystals having the following data: $^1$H-NMR (CDCl$_3$, 400 MHz, RT) δ0.89 (t; 6 H, H-12, H-12'); 1.10, 1.16 (s, 12 H, H-5, H-5'); 1.27 (m, 40 H, H-11 to H-20, H-11' to H-20'); 1.43 (t, 2 H, H-3); 1.62 (q, 4 H, H-10, H-10'); 1.82 (dd, 2 H, H-3); 2.27, 2.29 (2 t, 2 H each, H-9, H-9'); 2.69 (t, 2 H, H-6); 3.97 (t, 2 H, H-7); 5.08 (tr tr, 1 H, H-4); and $^{13}$C-NMR (CDCl$_3$, 100 MHz, RT) δ 14.24, C-21, C-21; 22.30 C-5, 22.82, C-20, C-20'; 25.09, 25.13 C-10, C-10'; 29.24, 29.29, 29.40, 29.48, 29.59, 29.73, 29.78, 29.80 C-11 to C-18, C11' to C-18'; 32.05 C-19, C-19'; 33.87 C-5'; 34.39, 34.79 C-9, C-9'; 42.04 C-6; 45.78 C-3; 55.90 C-2; 66.62 C-7; 67.28 C-4; 173.62, 173.89 C-21, C-21'.

Example 7

Dodecanoic acid 2-(4-dodecanoyloxy-2,2,6,6-tetramethyl-piperidin-1-yl)-ethyl ester (Compound 7)

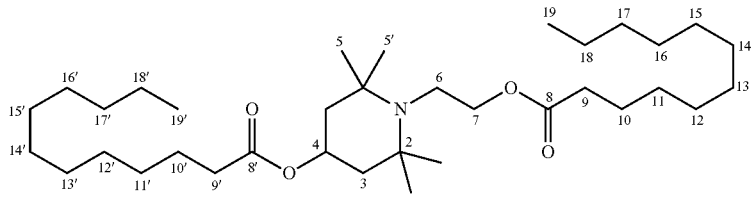 [SMILES: CCCCCCCCCCCC(=O)OCCN1C(C)(C)CC(OC(=O)CCCCCCCCCCC)CC1(C)C]

A jacketed 250 ml flask is fitted with an anchor stirrer, inner thermometer, and a Dean-Stark apparatus with reflux condenser. The flask is charged with HE-HTMP (17.1 g, 84 mmol), "Petrol" (78.6 g), ("Petrol" is defined above), methyl laurate (38.4 g, 176 mmol) and aluminium tri-isopropylate (0.4 g, 1.96 mmol). The obtained mixture is heated at reflux (mantle temperature 190° C.) for four hours. A slight vacuum (800 mbar) is applied and heating is continued for another 5 hours. The conversion is 95% as determined by NMR after removal of the solvent in vacuum (136° C., 0.19 mbar) the product is obtained as yellow oil (50.9 g, 102%), which crystallized slowly at ambient temperature. The product can be prepared also as follows: a 250 ml jacketed vessel is fitted with an anchor stirrer, an inner thermometer and a descending condenser is charged with HE-HTMP (38.41 g, 0.191 mol) and methyl laurate (86.01 g, 0.40 mol). This mixture is heated and at an inner temperature of 151° C. tetrabutyl orthotitanate (0.16 g, 0.47 mmol) is added. The mantel temperature is set to 180° C. and mixture is kept stirring for 24 hours. A gas chromatographic analysis showed about 99% conversion. The mixture is cooled to 80° C. and then added into refluxing methanol (300 g). The obtained emulsion is allowed to cool slowly and seeded when the temperature is at 35° C. A suspension of seed crystals is obtained by taking about 1 ml of the emulsion into a test tube and scratching with a spatula. After cooling to ambient temperature and stirring for another couple of hours, the crystallized product is filtered off, washed with methanol (about 100 ml) and dried on the rotary evaporator (30° C., 23 mbar, 6 hours) to give 98.4 g (91.1% based on HE-HTMP) of colorless crystals having the flowing data: $^1$H-NMIR (CDCl$_3$. 400 MHz, RT) δ 0.89 (tr, 6 H, H-19, H-19'); 1.10, 1.16 (2 s, 6 H each, H-5, H-5'); 1.20-1.38 (br m, 32 H, H-11-H-18, H-11'-H-18'); 1.43 ("tr", 2 H, H-3); 1.62 (m, 4 H, H-10, H-10'); 1.83 ("dd", 2 H, H-3'); 2.28 (m, 4 H, H-9, H-9'); 2.68 ("tr", 2 H, H-6); 3.97 ("tr", 2 H, H-7); 5.08 (tr tr, 1 H, H-4); and $^{13}$C-NMR (CDCl$_3$, 100 MHz, RT) δ 14.10 (2 C, C-19, C-19'); 22.16 (2 C, C-5); 22.67 (2 C, C-18, C-18'); 24.95, 25.00 (2 C, C-10, C-10'); 29.10 (1 C), 29.16 (1 C), 29.26 (2 C), 29.32 (2 C), 29.44 (1 C), 29.45 (1 C), 29.59 (4 C) C-11-C16, C-11'-C-16'; 31.90 (2 C, C-17, C-17'); 33.73 2 C C-5'; 34.26, 34.65 (C-9, C-9'); 41.90 (C-6); 45.64 (C-3); 55.76 (C-2); 64.48 (C-7); 67.15 (C-4); 173.50, 173.76 (C-8, C-8').

Example 8

Hexanoic acid 2-(4-hexanoyloxy-2,2,6,6-tetramethyl-piperidin-1-yl)-ethyl ester (Compound 8)

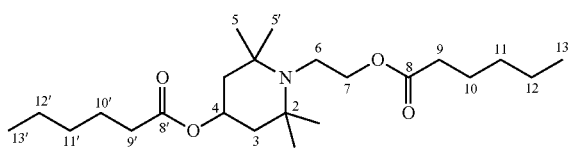 [SMILES: CCCCCC(=O)OCCN1C(C)(C)CC(OC(=O)CCCCC)CC1(C)C]

A jacketed 250 ml flask is fitted with an anchor stirrer, inner thermometer, and a reflux condenser which is connected to a gas absorber. Into this flask is charged HE-HTMP (50.14 g, 0.249 mol) and xylene (isomer mixture, 120 g). The mixture is heated at reflux, and then at an inner temperature of 142° C. is added hexanoic acid chloride (67.77 g 0.503 mol) within one hour. Shortly after the beginning of the addition of the acid chloride, the reaction mixture turned into a viscous suspension which later became more fluid again. After the complete addition of the acid chloride, the mixture is kept at 142° C. for another two hours and then cooled to 80° C. The mixture is then washed twice with a solution of sodium carbonate (each 50 g of a 10% solution) and water (40 g). After removal of the xylenes on the rotary evaporator, the product is distilled under vacuum (b.p. 190-200° C. at 0.001 mbar) to give 81.5 g (82.3% yield) of the product as colourless oil having the following data: $^1$H-NMR (CDCl$_3$, 400 MHz, RT) δ 0.89 (t, 3 H each, H-13, H-13'); 1.08, 1.15 (s, 6 H each, H-5, H-5'); 1.32 (m, 8 H, H-11-H-12, H11'-H12'); 1.41, 1.80 (t, q; 2 H each, H-3, H-3'); 1.61 (q, 2 H each, H-10, H-10'); 2.27 (q, 4 H, H-9, H-9'); 2.67 (t, 2 H, H-6); 3.95 (t, 2 H, H-7); 5.06 (m, 1 H, H-4); and $^{13}$C-NMR (CDCl$_3$, 100 MHz, RT) δ 13.88 C-13, C-13'; 22.15, 33.72 C-5, C-5'; 22.30 C-12, C-12'; 24.61, 24.65 C-10, C-10'; 31.26, 31.61 C-11, C-11'; 34.19, 34.58 C-9, C-9'; 41.89 C-6; 45.62 C-3; 55.75 C-2; 66.47 C-7; 67.14 C-4; 173.45, 173.73 C-8, C-8'.

Example 9

Propionic acid 2-(2,2,6,6-tetramethyl-4-propionyloxy-piperidin-1-yl)-ethyl ester (Compound 9)

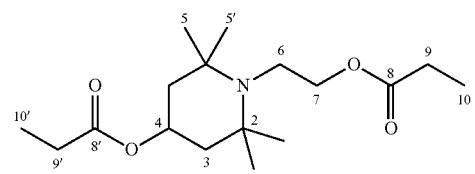 [SMILES: CCC(=O)OCCN1C(C)(C)CC(OC(=O)CC)CC1(C)C]

A three necked flask with magnetic stirrer, reflux condenser, and pressure equalized dropping funnel is charged with HE-HTMP (100.0 g, 0.497 mol). The apparatus is flushed thoroughly with nitrogen, and then immersed in an oil bath of 140° C. Then propionic acid anhydride (131.4 g, 1.011 mol) is added via the dropping funnel within 75 minutes. During the addition of the propionic anhydride, the reaction mixture liquefied. After the addition of the propionic anhydride is complete, the mixture is heated at 150° C. for 90 minutes (after 90 minutes gas chromatographic analysis indicated completion of the reaction). The propionic acid is removed from the reaction mixture by a rotary evaporator and the residue poured into a beaker containing water (about 250 ml) and dichloromethane (about 300 ml). The pH of the bi-phasic mixture was carefully adjusted with sodium hydrogen carbonate to pH=7.0 and then the organic layer separated with a seperatory funnel, dried (sodium sulfate) and distilled in vacuum. The product (144.1 g, 92.6% yield) is obtained as pale yellow oil (b.p. 120-141° C., 5·10$^{-3}$-7·10$^{-3}$ mbar), which solidified on standing with a melting point ≈25° C. having the following data: $^1$H-NMIR (CDCl$_3$. 400 MHz, RT) δ 0.98, 1.05 (2 s, 6 H each, H-5, H-5'); 1.01, 1.03 (2 tr, 3 H each, J=7.5 Hz, H-10, H-10'); 1.31 ("tr", 2 H), 1.71 ("dd", 2 H) H-3, H3'; 2.18, 2.21 (2 q, 2 H each, H-9, H-9'); 2.58 (tr, 2 H, H-6); 2.58 (tr, 2 H, H-7); 4.96 (tr tr, J=11.6 Hz, J=4.1 Hz, 1 H, H-4). $^{13}$C-NMR (CDCl$_3$, 100 MHz, RT) δ 8.96, 8.97 C-10, C-10'; 27.28, 27.70 C-5, C-5'; 41.79 C-6; 45.54 C-3; 55.63 C-2; 66.36 C-7; 67.02 C-4; 173.76, 174.05 C-8, C-8'.

Example 10

Acetic acid 2-(4-acetoxy-2,2,6,6 tetramethyl-piperidin-1-yl)-ethyl ester (Compound 10)

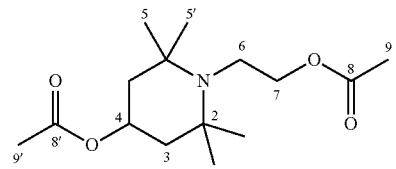 [SMILES: CC(=O)OCCN1C(C)(C)CC(OC(C)=O)CC1(C)C]

A three necked flask with over-head stirrer, reflux condenser, pressure equalized dropping funnel is charged with HE-HTMP (101.0 g, 0.502 mol). The apparatus is flushed thoroughly with nitrogen, and then immersed in an oil bath of 130° C. Then acetic acid anhydride (103.2 g, 1.011 mol) is added via the dropping funnel within about one hour. During the addition of the acid anhydride, the reaction mixture liquefied. Four hours after the addition of the acetic anhydride was completed, the conversion of the HE-HTMP was 93%, as indicated by gas chromatographic analysis. After another 90 minutes at 130° C., the reaction mixture is allowed to cool to ambient temperature, diluted with dichloromethane (about 200 ml) and poured into water. The pH of the bi-phasic mixture is carefully adjusted with sodium hydrogen carbonate to pH=7.0. The organic layer is then separated with a seperatory funnel, and washed twice with water (ca. 200 ml each), dried (sodium sulphate) and the solvent removed on a rotary evaporator. The residue (141 g reddish oil) is distilled in vacuum (b.p.=115°-125° C. at 0.01-0.019 mbar) to give a yellowish oil (129. 5 g, 90.4% yield), which solidified on standing having a melting point=53-54° C. giving the following data: $^1$H-NMR (CDCl$_3$. 400 MHz, RT) δ 1.08, 1.15 (2 s, 6 H each, H-5, H-5'); 1.41 ("tr", 2 H), 1.82 ("dd", 2 H), H-3, H-3'; 2.02, 2.04 (2 s, 3 H each, H-9, H-9'); 2.68 (tr, 2 H, H-6); 3.96 (tr, 2 H, H-7); 5.06 (tr tr, 1 H, H-4); and $^{13}$C-NMR (CDCl$_3$. 100 MHz) δ 20.92, 21.40 C-9, C-9'; 22.14, 33.72 C-5, C-5'; 41.85 C-6; 45.60 C-3; 55.60 C-2; 66.64 C-7; 67.40 C-4; 170.61, 171.89 C-8, C-8'.

Example 11

3-Methoxy-propionic acid 2-[4-(3-methoxy-propionyl-oxy)-2,2,6,6-tetramethyl-piperidin-1-yl]-ethyl ester (Compound 11)

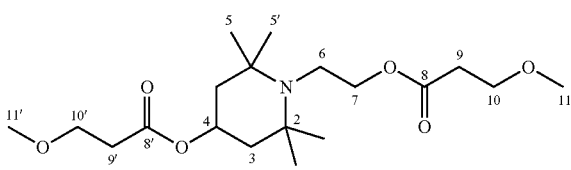

A jacketed 250 ml flask is fitted with an anchor stirrer, inner thermometer, gas inlet tube and a Dean-Stark apparatus with reflux condenser. The flask is charged with HE-HTMP (138 g, 0.69 mol) and xylenes (108 g, mixture of isomers). The mixture is heated at reflux (mantle temperature=150° C.), and about 40 ml of the solvent is distilled off in order to remove the water as an azeotrope with the xylenes. Then the temperature is reduced to 80° C. and 3-methoxypropionic acid methyl ester (92.0 g, 0.75 mol) and tetrabutyl ortho-titanate (0.1 g) are added. The mixture is then heated again at reflux and the forming methanol distilled off. After completion of the reaction, the mixture was allowed to cool and the resulting solution of the product is washed three times with water (250 ml each time). After drying (sodium sulphate) and removal of the xylenes on the rotary evaporator, the residue is distilled in vacuum (boiling point 167° C./1.1×10$^{-2}$ mbar) to give the product as clear, pale yellow liquid having the following data: $^1$H-NMR (CDCl$_3$, 400 MHz) δ 1.08, 1.15 (2 s, 6 H each, H-5, H-5'); 1.43 ("tr", 2 H), 1.83 ("d d", 2 H) H-3, H-3'; 2.53, 2.56 (2 tr, 2 H each, H-9, H-9'); 2.69 ("dd", 2 H, H-6); 3.34, 3.35 (2 s, 3 H each, H-11, H-11'); 3.64, 3.65 (2 tr, 2 H each, H10, H-10'); 3.98 ("dd", 2 H, H-7); 5.10 (tr tr, 1 H, H-4); and $^{13}$C-NMR (CDCl$_3$, 100 MHz) □ 22.09, 33.63 C-5, C-5'; 34.83, 35.18 C-9, C-9'; 41.75, C-6; 45.49, C-3; 55.70, C-2; 58.63, 58.65 C-11, C-11'; 66.64 C-7; 67.53 C-4; 67.86, 67.88 C-10, C-10'; 171.04, 171.34 C-8, C-8'.

Example 12

Methoxy-acetic acid 2-[4-(2-methoxy-acetoxy)-2,2,6,6-tetramethyl-piperidin-1-yl]-ethyl ester (Compound 12)

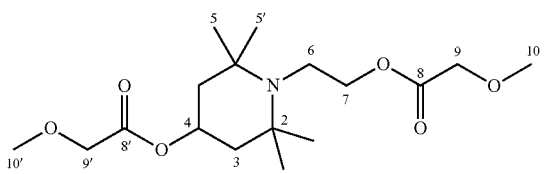

The title compound is prepared in an analogous manner as described in Example 11 using 2-methoxyacetic acid methyl ester instead of 3-methoxypropionic acid methyl ester. The crude products from two batches (in one batch 0.2 mol HE-HTMP are used, in the other batch 0.4 mol HE-HTMP are used, both crude products are brown oils) are combined for purification. The combined crude materials are dissolved in toluene (250 ml), and the dark brown solution decolorized with bleaching earth (75 g and 50 g of Tonsil Optimum FF, Clariant). After filtration, the solvent is removed from the obtained light brown solution on the rotary evaporator. Upon cooling to ambient temperature, the product started to crystallize. Thus, the material is re-dissolved in a minimum quantity of toluene at reflux (about 100 ml) and the solution allowed to cool slowly to 0° C. Then n-hexane (170 g) is added to bring crystallization to completion. The obtained almost colorless crystals are filtered off, washed with a small quantity of n-hexane and dried to give 115.9 g (62% combined yield based on hE-HTMP) of almost colorless crystals with a melting point=57-58° C. and having the following data: $^1$H-NMR (CDCl$_3$, 400 MHz) δ 0.80, 0.86 (2 s, 6 H each, H-5, H-5'); 1.15 "tr", 2 H, 1.55 "dd", 2 H, H-3, H-3'; 2.41 ("dd", 2 H, H-6); 3.11, 3.17 (2 s, 3 H each, H-10, H-10'); 3.67, 3.71 (2 s, 2 H each, H-9, H-9'); 3.73, "dd", 2 H, H-7); 4.83 (tr tr, 1 H, H-4); and $^{13}$C-NMR (CDCl3, 100 MHz) δ 21.91, 33.35 C-5, C-5'; 41.51 C-6; 45.29 C-3; 55.49 C-2; 58.78 58.83 C-10, C-10'; 66.28 C-7; 67.56 C-4; 69.33, 69.52 C-9, C-9'; 169.38, 169.68 C-8, C-8'.

Example 13

4-Oxo-hexanoic acid 2,2,6,6-tetramethyl-1-[2-(4-oxo-pentanoyloxy)-ethyl]-piperidin-4-yl ester (Compound 13)

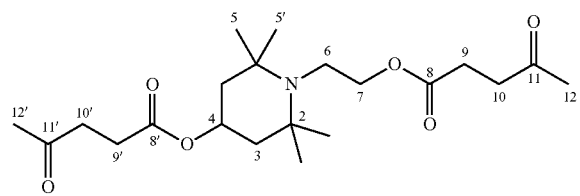 [SMILES: CC(=O)CCC(=O)OCCN1C(C)(C)CC(OC(=O)CCC(C)=O)CC1(C)C]

A 250 ml jacketed vessel is fitted with an anchor stirrer, an inner thermometer and a descending condenser. It is charged with HE-HTMP (84.5 g, 0.42 mol) and methyl levulinate (114.76 g, 0.882 mol). This mixture is heated and at an inner temperature of 151° C. tetrabutyl orthotitanate (0.12 g, 0.36 mmol) is added. The mantel temperature is set to 180° C. and mixture is kept stirring for 24 hours. The excess methyl levulinate is removed in vacuum (1 h at 3 mbar) and then cooled to 80° C. The product is obtained as a very viscous brown oil, 154.4 g (92.5% based on HE-HTMP) having the flowing data: $^1$H-NMR (CDCl$_3$, 400 MHz, RT) δ 0.89, 0.96 (2 s, 6 H each, H-5, H-5'); 1.24, 1.63 (2 m, 2 H each, H-3, H-3'); 2.00 (s, 6 H, H-12, H-12'); 2.36 (tr, 4 H, H-9, H-9'); 2.49 (tr, 2 H, H-6); 2.56 ("tr", 4 H, H-10, H-10'); 3.77 (tr, 2 H; H-7); 4.86 (trtr, 1 H, H-4); and $^{13}$C-NMR (CDCl$_3$, 100 MHz, RT,) δ 21.87, 33.41 (C-5, C-5'); 27.57, 28.03 (C-9, C-9'); 29.50, 29.52 (C-12, C-12'); 37.56, 37.59 (C-10, C-10'); 41.51 (C-6); 45.24 (C-3); 55.45 (C-2); 66.42 (C-7); 67.34 (C-4); 171.89, 172.25 (C-8, C-8'); 206.10; 206.17 (C-11, C-11').

Example 14

Octyl 3-(2H-Benzotriazol-2-yl)-5-tert-butyl-4-hydroxy-hydrocinnamate. Methyl 3-(2H-benzotriazol-2-yl)-5-tert-butyl-4-hydroxyhydrocinnamate (353 g, 1 mol), isooctanol (260 g, 2 mol, from Exxon) and dibutyltin oxide (0.5 g, 0.002 mol) are charged to a reaction flask and heated to 175° C. While heating to 175° C., a 300 mm Hg vacuum is applied. After holding at 175° C. for 30 minutes, the excess isooctanol is distilled by slowly reducing the pressure to <5 mm Hg. The desired product is cooled and discharged. The title compound is obtained in a yield of 451 g (100%) as a light yellow oil whose structure is verified by $^1$H nmr and mass spectroscopy. The non-distilled product is analyzed by ICP (Inductively Coupled Plasma) for tin and is found to contain 170 ppm of tin.

Example 15

Octyl 3-(2H-Benzotriazol-2-yl)-5-tert-butyl-4-hydroxy-hydrocinnamate. The product prepared in Example 14 is further purified by short path distillation. When this distilled material is analyzed for residual tin by ICP, it is found to contain <5 ppm of tin (below the detection limit of the analytical instrument).

The compounds of Example 14 and Example 15, UV absorbers, are chemically identical except for the levels of tin in each example. In the following examples, weight percent additives are based on the weight of the wax.

Example 16

Color Fade of a Pink Floral-Scented Candle Wax under Fluorescent Lamp Exposure. A variety of different stabilizers are evaluated in a pink scented candle wax under fluorescent lamp exposure. The Delta E values represent the change in color after the indicated days of exposure. A low Delta E value indicates less change in color and is highly desired.

| Sample* (wt % add) | Delta E after 264 hours |
|---|---|
| Blank (no add) | 11.62 |
| Example 15 (0.4%) + Compound A (0.4%) | 2.80 |
| Example 15 (0.4%) + Compound B (0.4%) | 1.60 |
| Example 15 (0.4%) + Compound B (0.2%) + Compound 2 (0.2%) | 1.44 |
| Example 15 (0.4%) + Compound 2 (0.4%) | 1.39 |

*A is bis(1,2,2,6,6-pentamethylpiperidin-4-yl) sebacate, a hindered amine light stabilizer. B is bis(1-octyloxy-2,2,6,6-tetramethylpiperidin-4-yl) sebacate, a hindered amine light stabilizer.

The combination of a benzotriazole UV absorber and a hindered amine light stabilizer of the instant invention give even better stabilization efficacy than stabilized candle wax compositions known by the skilled artisan.

Example 17

Color Fade of a Pink Floral-Scented Candle Wax under Fluorescent Lamp Exposure. A variety of different stabilizers are evaluated in a pink scented candle wax under fluorescent lamp exposure. The Delta E values represent the change in color after the indicated days of exposure. A low Delta E value indicates less change in color and is highly desired.

| Sample* (wt % add) | Delta E after 264 hours |
|---|---|
| Blank (no add) | 11.62 |
| Compound C (0.4%) + Compound A (0.4%) | 2.46 |
| Compound C (0.4%) + Compound B (0.4%) | 1.14 |
| Compound C (0.4%) + Compound 2 (0.4%) | 1.09 |

*A is bis(1,2,2,6,6-pentamethylpiperidin-4-yl) sebacate, a hindered amine light stabilizer. B is bis(1-octyloxy-2,2,6,6-tetramethylpiperidin-4-yl) sebacate, a hindered amine light stabilizer. C is 2-(2-hydroxy-3,5-di-tert-amylphenyl)-2H-benzotriazole, a benzotriazole UV absorber.

The combination of a UV absorber and a hindered amine light stabilizer of the instant invention give even better stabilization efficacy than stabilized candle wax compositions known by the skilled artisan.

Example 18

Color Fade of a Pink Floral-Scented Candle Wax under Fluorescent Lamp Exposure. A variety of different stabilizers are evaluated in a pink scented candle wax under fluorescent lamp exposure. The Delta E values represent the change in color after the indicated days of exposure. A low Delta E value indicates less change in color and is highly desired.

| Sample* (wt % add) | Delta E after 264 hours |
|---|---|
| Blank (no add) | 11.62 |
| Compound D (0.4%) + Compound A (0.4%) | 2.05 |
| Compound D (0.4%) + Compound B (0.4%) | 1.19 |
| Compound D (0.4%) + Compound B (0.2%) + Compound 2 (0.2%) | 0.90 |

*A is bis(1,2,2,6,6-pentamethylpiperidin-4-yl) sebacate, a hindered amine light stabilizer. B is bis(1-octyloxy-2,2,6,6-tetramethylpiperidin-4-yl) sebacate, a hindered amine light stabilizer. D is the mixture prepared by the reaction of 2,4,6-tris(2,4-dihydroxyphenyl)-s-triazine and isooctyl α-bromopropionate, a triazine UV absorber.

The combination of a triazine UV absorber, a hindered amine light stabilizer of the instant invention and an additional hindered amine light stabilizer gives even better stabilization efficacy.

Example 19

Color Fade of a Pink Floral-Scented Candle Wax under Fluorescent Lamp Exposure. A variety of different stabilizers are evaluated in a pink scented candle wax under fluorescent lamp exposure. The Delta E values represent the change in color after the indicated days of exposure. A low Delta E value indicates less change in color and is highly desired.

| Sample* (wt % add) | Delta E after 216 hours |
|---|---|
| Blank (no add) | 11.44 |
| Example 15 (0.2%) + Compound 2 (0.2%) | 3.50 |
| Example 14 (0.2%) + Compound 2 (0.2%) | 2.76 |

The combination of a benzotriazole UV absorber, a hindered amine light stabilizer of the instant invention and a metal gives even better stabilization efficacy.

The comparative test data presented here, clearly illustrates that a distilled benzotriazole UV absorber as seen in Example 15 has no discernible amount of tin present while the same benzotriazole UV absorber as manufactured, but not distilled, as seen in Example 14 still contains a residual amount (170 ppm) of tin content. While the effectiveness of stabilizers will depend on the specific dye and/or scent present in the candle wax, inspection of the data above shows that the UV absorber of Example 14 (with tin present) is clearly more effective than the same UV absorber of Example 15 (with no discernible tin present). This example shows that even the excellent protection afforded by the UV absorber with the concomitant presence of a select hindered amine light stabilizer of formula (I) and a metal.

Example 20

Color Fade of a Pink Floral-Scented Candle Wax under Fluorescent Lamp Exposure. A variety of different stabilizers are evaluated in a pink scented candle wax under fluorescent lamp exposure. The Delta E values represent the change in color after the indicated days of exposure. A low Delta E value indicates less change in color and is highly desired.

| Sample* (wt % add) | Delta E after 336 hours |
|---|---|
| Blank (no add) | 12.62 |
| Compound E (0.4%) + Compound B (0.4%) | 4.19 |
| Compound E (0.4%) + Compound B (0.2%) + Compound 2 (0.2%) | 3.76 |

*B is bis(1-octyloxy-2,2,6,6-tetramethylpiperidin-4-yl) sebacate, a hindered amine light stabilizer. E is 4-octyloxy-2-hydroxybenzophenone, a benzophenone UV absorber.

The combination of a benzophenone UV absorber, a hindered amine light stabilizer of the instant invention and an additional hindered amine light stabilizer gives even better stabilization efficacy.

Example 21

Color Fade of a Green Scented Candle Wax under Fluorescent Lamp Exposure. Green scented candle wax as described herein is well stabilized by 0.2% by weight of dimethyl p-methoxybenzylidenemalonate, SANDUVOR® PR 25, in combination with 0.2% by weight of 2-[4-(2,2-dimethylpropanoyloxy)-2,2,6,6-tetramethyl-1-piperidyl] ethyl 2,2-dimethylpropanoate (Compound 1).

Example 22

Color Fade of a Yellow Scented Candle Wax under UV Lamp Exposure. Yellow scented candle wax as described herein is well stabilized by 0.1% by weight of di(1,2,2,6,6-pentamethylpiperidin-4-yl) p-methoxybenzylidenemalonate, SANDUVOR® PR 31, in combination with 0.1% by weight of 2-ethyl-hexanoic acid-2-[4-(2-ethyl-hexanoyloxy)-2,2,6,6-tetramethyl-piperidin-1-yl]-ethyl ester (Compound 3).

Example 23

Color Fade of a Red Unscented Candle Wax under UV Lamp Exposure. Red unscented candle wax as described herein is well stabilized by 0.1% by weight of dimethyl di(p-chlorophenyl)methylenemalonate in combination with 0.1% by weight of octadecanoic acid 2-(2,2,6,6-tetramethyl-4-octadecanoyloxy-piperidin-1-yl)-ethyl ester (Compound 4).

Example 24

Color Fade of a Red Unscented Candle Wax under Fluorescent Lamp Exposure. Red unscented candle wax as described herein is well stabilized by 0.2% by weight of dimethyl di(p-methoxyphenyl)methylenemalonate in combination with 0.2% by weight of hexadecanoic acid 2-(4-hexadecanoyloxy-2,2,6,6-tetramethyl-piperidin-1-yl)-ethyl ester (Compound 5).

Example 25

Color Fade of a Green Unscented Candle Wax under Fluorescent Lamp Exposure. Green unscented candle wax as described in herein is well stabilized by 0.1% by weight of 4,4'-dimethoxy-2,2'-dihydroxybenzophenone in combination with 0.1% by weight of tetradecanoic acid 2-(2,2,6,6-tetra-methyl-4-tetradecanoyloxy-piperidin-1-yl)-ethyl ester (Compound 6).

Example 26

Color Fade of a Green Unscented Candle Wax under Fluorescent Lamp Exposure. Green unscented candle wax as described herein is well stabilized by 0.2% by weight of 4-tert-butylphenyl-2-hydroxybenzoate in combination with 0.1% by weight of dodecanoic acid 2-(4-dodecanoyloxy-2, 2,6,6-tetramethyl-piperidin-1-yl)-ethyl ester (Compound 7).

Example 27

Color Fade of a Yellow Unscented Candle Wax under Fluorescent Lamp Exposure. Yellow unscented candle wax as described herein is well stabilized by 0.2% by weight of 2-ethoxy-2-ethyloxanilide in combination with 0.1% by weight of hexanoic acid 2-(4-hexanoyloxy-2,2,6,6-tetramethyl-piperidin-1-yl)-ethyl ester (Compound 8).

Example 28

Color Fade of a Yellow Unscented Candle Wax under Fluorescent Lamp Exposure. Yellow unscented candle wax as described herein is well stabilized by 0.2% by weight of 3-hydroxyphenyl benzoate in combination with 0.2% by weight of propionic acid 2-(2,2,6,6-tetramethyl-4-propionyloxy-piperidin-1-yl)-ethyl ester (Compound 9).

Example 29

Color Fade of a Blue Unscented Candle Wax under Fluorescent Lamp Exposure. Blue unscented candle wax as described herein is well stabilized by 0.2% by weight of dodecyl 3-phenyl-3-methyl-α-cyanoacrylate in combination with 0.1% by weight of acetic acid 2-(4-acetoxy-2,2,6,6 tetramethyl-piperidin-1-yl)-ethyl ester (Compound 10).

Example 30

Color Fade of a Blue Unscented Candle Wax under Fluorescent Lamp Exposure. Blue unscented candle wax as described here is well stabilized by 0.2% by weight of dodecyl 3,3-diphenyl-α-cyanoacrylate in combination with 0.1% by weight of the oligomeric compound which is the condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine and 0.1% by weight of 3-methoxy-propionic acid 2-[4-(3-methoxy-propionyl-oxy)-2,2,6,6-tetra-methyl-piperidin-1-yl]-ethyl ester (Compound 11).

Example 31

Color Fade of a Yellow Scented Candle Wax under Fluorescent Lamp Exposure. Yellow scented candle wax as described herein is well stabilized by 0.2% by weight of 2-{2-hydroxy-3-tert-butyl-5-[2-(omega-hydroxy-octa-(ethyleneoxy)carbonyl)ethyl]phenyl}-2H-benzotriazole in combination with 0.2% by weight of methoxy-acetic acid 2-[4-(2-methoxyacetoxy)-2,2,6,6-tetramethyl-piperidin-1-yl]-ethyl ester (Compound 12).

Example 32

Color Fade of a Yellow Scented Candle Wax under Fluorescent Lamp Exposure. Yellow scented candle wax as described in herein is well stabilized by 0.1% by weight of 2-[2-hydroxy-3-(α,α-dimethylbenzyl)-5-tert-octylphenyl]-2H-benzotriazole in combination with 0.2% by weight of 4-oxo-hexanoic acid 2,2,6,6-tetramethyl-1-[2-(4-oxo-pentanoyloxy)-ethyl]-piperidin-4-yl ester (Compound 13).

Example 33

Color Fade of a Yellow Scented Candle Wax under Fluorescent Lamp Exposure. Yellow scented candle wax as described herein is well stabilized by 0.2% by weight of 2-{2-hydroxy-3-tert-butyl-5-[2-(omega-hydroxy-octa-(ethyleneoxy)carbonyl)ethyl]phenyl}-2H-benzotriazole and 0.2% by weight of methyl 3-(2H-benzotriazol-2-yl)-5-tert-butyl-4-hydroxyhydrocinnamate in combination with 0.2% by weight of 3,5,5-trimethyl-hexanoic acid-2,2,6,6-tetramethyl-1-[2-(3,5,5-trimethyl-hexanoyloxy)-ethyl]-piperidin-4-yl ester (Compound 2).

Para. A. A stabilized composition comprising:
candle wax;
an ultraviolet light absorber; and
a hindered amine light stabilizer of formula (I)

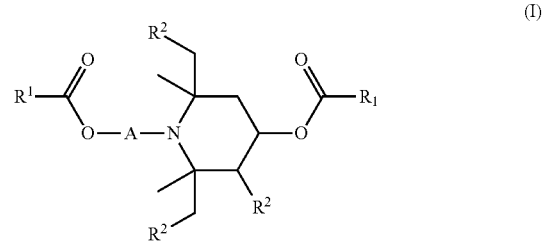

(I)

wherein:
A is —CH($R^3$)—CH$_2$— or —CH$_2$—CH($R^3$)—;
each $R^1$ is $C_1$-$C_{21}$ alkyl; acyclic $C_3$-$C_{21}$ alkenyl having 1, 2, or 3 double bonds; or $C_3$-$C_7$ cycloalkyl;
$R^2$ is H or $C_1$-$C_3$ alkyl;
$R^3$ is H or $C_1$-$C_4$ alkyl; and
$R^4$ is $C_1$-$C_4$ alkyl.

Para. B. The composition of Para. A, wherein $R^1$ is $C_1$-$C_{21}$ alkyl substituted with at least one substituent of formula O$R^5$ or CN, wherein $R^5$ is H, methyl, ethyl, n-propyl, iso-propyl, n-butyl, sec-butyl, or tert-butyl; $C_3$-$C_7$ cycloalkyl substituted with at least one substituent that methyl, ethyl, n-propyl, iso-propyl, n-butyl, sec-butyl, or tert-butyl, O—$R^5$ or —CN; or $C_4$-$C_{21}$ alkyl substituted with —CO—$R^4$, wherein $R^4$ is methyl, ethyl, n-propyl, iso-propyl, n-butyl, sec-butyl, or tert-butyl.

Para. C. The composition of Para. A or B, wherein each $R^1$ is $C_1$-$C_{17}$ alkyl, $C_3$-$C_{12}$ alkyl, or $C_3$-$C_6$ cycloalkyl.

Para. D. The composition of Paras. A-C, wherein component each $R^1$ is a $C_1$-$C_{17}$ alkyl.

Para. E. The composition of Paras. A or B, wherein each $R^1$ is $C_1$-$C_{21}$ alkyl substituted with at least one substituent of $C_1$-$C_4$ alkoxy or —OH.

Para. F. The composition of any one of Paras. A-E, wherein $R^2$ is H.

Para. G. The composition of any one of Paras. A-F, wherein A is —CH$_2$—CH$_2$—, —CH(CH$_3$)—CH$_2$— or —CH$_2$—CH(CH$_3$)—.

Para. H. The composition of Para. A, wherein the hindered amine light stabilizer is:

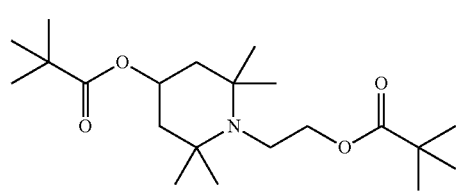

(1)

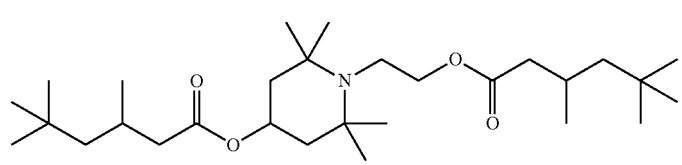

(2)

-continued
(3)
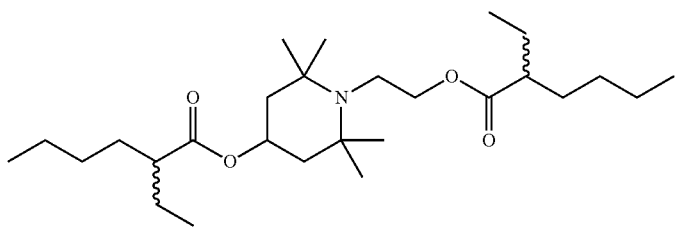
(4)
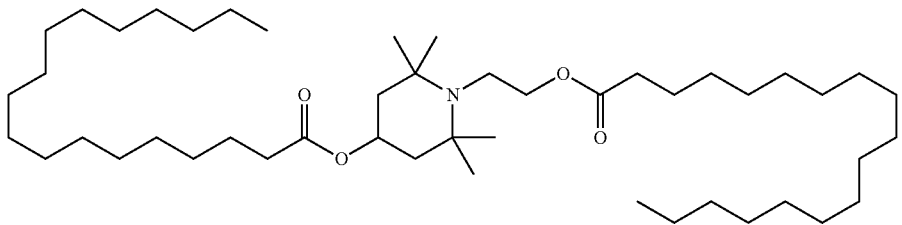
(5)
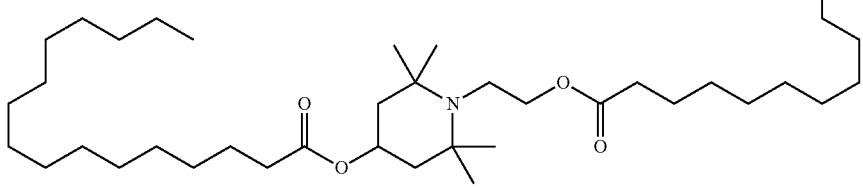
(6)
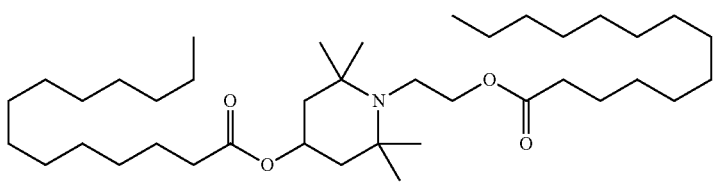
(7)
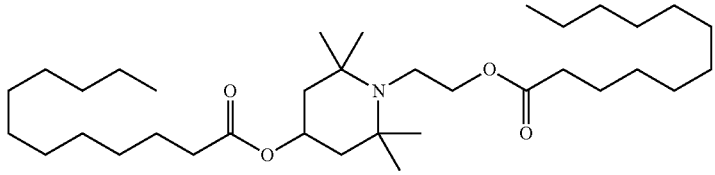
(8)
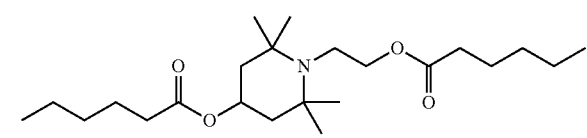
(9)
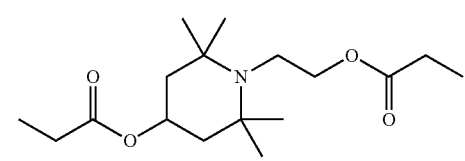
(10)
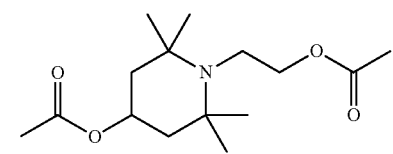

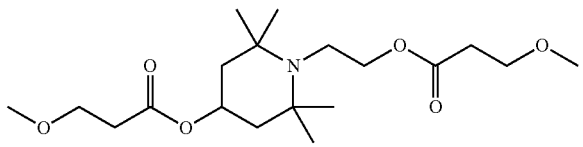

(11)

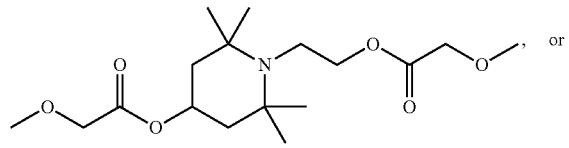

(12)

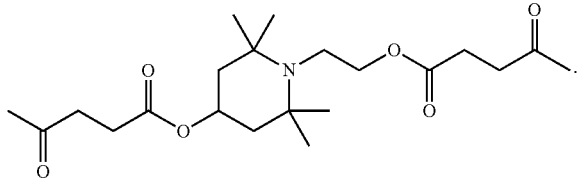

(13)

Para. I. The composition of any one of Paras. A-H, wherein the ultraviolet light absorber is at least one compound selected from the group consisting of: benzotriazole, benzophenone, alpha-cyanoacrylate, oxanilide, s-triazine, cinnamate, malonate, benzoate, salicylate and benzoxazin-4-one.

Para. J. The composition of Para. K, wherein the ultraviolet light absorber is a benzotriazole, a benzophenone, or an s-triazine.

Para. K. The composition of Para. J, wherein the ultraviolet light absorber is a benzotriazole.

Para. L. The composition of Para. K, wherein the ultraviolet light absorber is:
4-octyloxy-2-hydroxy-benzophenone;
4-methoxy-2-hydroxy-benzophenone;
2-(2-hydroxy-5-methylphenyl)-2H-benzotriazole;
2-(2-hydroxy-5-tert-octylphenyl-2H-benzotriazole;
2-(2-hydroxy-3,5-di-tert-amylphenyl)-2H-benzotriazole;
octyl 3-(benzotriazol-2-yl)-5-tert-butyl-4-hydroxyhydrocinnamate;
2-(2-hydroxy-3,5-di-tert-butylphenyl)-2H-benzotriazole;
2-(2-hydroxy-5-tert-butylphenyl)-2H-benzotriazole;
5-chloro-2-(2-hydroxy-3,5-di-tert-butylphenyl)-2H-benzotriazole;
5-chloro-2-(2-hydroxy-3-tert-butyl-5-methylphenyl)-2H-benzotriazole;
2-(2-hydroxy-3-sec-butyl-5-tert-butylphenyl)-2H-benzotriazole;
2-(2-hydroxy-4-octyloxyphenyl)-2H-benzotriazole;
2-(2-hydroxy-3-dodecyl-5-methylphenyl)-2H-benzotriazole;
2-[2-hydroxy-3,5-di(alpha,alpha-dimethylbenzyl)phenyl]-2H-benzotriazole;
2-[2-hydroxy-3-(α,α-dimethylbenzyl)-5-tert-octylphenyl]-2H-benzotriazole;
2-{2-hydroxy-3-tert-butyl-5-[2-(Ω-hydroxy-octa(ethyleneoxy)carbonyl)-ethyl]phenyl}-2H-benzotriazole;
2-{2-hydroxy-3-tert-butyl-5-[2-(octyloxy)carbonyl)ethyl]phenyl}-2H-benzotriazole;
2-ethylhexyl p-methoxycinnamate;
4-methoxy-2,2'-dihydroxybenzophenone;
4,4'-dimethoxy-2,2'-dihydroxybenzophenone;
2,4-bis(2,4-dimethylphenyl)-6-(2-hydroxy-4-octyloxyphenyl)-s-triazine;
2,4-diphenyl-6-(2-hydroxy-4-hexyloxyphenyl)-s-triazine;
2,4-bis(2,4-dimethylphenyl)-6-[2-hydroxy-4-(3-do-tri-decyloxy-2-hydroxy-propoxy)phenyl]-s-triazine; or
2,4-bis(2,4-dimethylphenyl)-6-[2-hydroxy-4-(3-do-tri-decyloxy-2-hydroxy-propoxy)-5-α-cumyl-phenyl]-s-triazine.

Para. M. The composition of Para. L, wherein the ultraviolet light absorber is:
4-octyloxy-2-hydroxybenzophenone;
4-methoxy-2-hydroxybenzophenone;
2-(2-hydroxy-5-tert-octylphenyl-2H-benzotriazole;
2-[2-hydroxy-3-(α,α-dimethylbenzyl)-5-tert-octylphenyl]-2H-benzotriazole;
2-{2-hydroxy-3-tert-butyl-5-[2-(Ω-hydroxy-octa(ethyleneoxy)-carbonyl)ethyl]phenyl}-2H-benzotriazole; or
2-{2-hydroxy-3-tert-butyl-5-[2-(octyloxy)carbonyl)ethyl]phenyl}-2H-benzotriazole.

Para. N. The composition of any one of Paras. A-M, wherein each $R^1$ is the same.

Para. O. The composition of any one of Paras. A-N further comprising a second hindered amine light stabilizer, a phenolic antioxidant, an organic phosphorus stabilizer, a hydroxylamine stabilizer, a nitrone stabilizer, or an amine oxide stabilizer.

Para. P. The composition of any one of Paras. A-O further comprising a second hindered amine stabilizer that is:
bis(1-octyloxy-2,2,6,6-tetramethylpiperidin-4-yl) sebacate;
bis(1-cyclohexyloxy-2,2,6,6-tetramethylpiperidin-4-yl) sebacate;
1-cyclohexyloxy-2,2,6,6-tetramethyl-4-octadecylaminopiperidine;
2,4-bis[(1-cyclohexyloxy-2,2,6,6-tetramethylpiperidin-4-yl) butylamino]-6-(2-hydroxyethylamino-s-triazine;
bis(1-cyclohexyloxy-2,2,6,6-tetramethylpiperidin-4-yl) adipate;
an oligomeric compound which is the condensation product of 4,4'-hexa-methylenebis(amino-2,2,6,6-tetramethylpiperidine) and 2,4-dichloro-6-[(1-octyloxy-2,2,6, 6-tetramethylpiperidin-4-yl)butylamino]-s-triazine end-capped with 2-chloro-4,6-bis(dibutylamino)-s-triazine;
an oligomeric compound which is the condensation product of 4,4'-hexa-methylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;
1-methoxy-4-hydroxy-2,2,6,6-tetramethylpiperidine;
1-octyloxy-4-hydroxy-2,2,6,6-tetramethylpiperidine;
1-cyclohexyloxy-4-hydroxy-2,2,6,6-tetramethylpiperidine;
1-methoxy-4-oxo-2,2,6,6-tetramethylpiperidine;
1-octyloxy-4-oxo-2,2,6,6-tetramethylpiperidine;
1-cyclohexyloxy-4-oxo-2,2,6,6-tetramethylpiperidine;
bis(1-heptyloxy-2,2,6,6-tetramethylpiperidin-4-yl) sebacate;
bis(1-nonyloxy-2,2,6,6-tetramethylpiperidin-4-yl) sebacate;
bis(1-dodecyloxy-2,2,6,6-tetramethylpiperidin-4-yl) sebacate; or
N,N',N'',N'''-tetrakis[(4,6-bis(butyl-1-octyloxy-2,2,6,6-pentamethylpiperidin-4-yl)-amino-s-triazin-2-yl]-1,10-diamino-4,7-diazadecane.

Para. Q. The composition of any one of Paras. A-O further comprising a second hindered amine stabilizer that is:
1-(2-hydroxy-2-methylpropoxy)-4-octadecanoyloxy-2,2,6,6-tetramethylpiperidine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
bis(1-(2-hydroxy-2-methylpropoxy)-2,2,6,6-tetramethylpiperidin-4-yl) sebacate;
bis(1-(2-hydroxy-2-methylpropoxy)-2,2,6,6-tetramethylpiperidin-4-yl) adipate;
bis(1-(2-hydroxy-2-methylpropoxy)-2,2,6,6-tetramethylpiperidin-4-yl) succinate;
bis(1-(2-hydroxy-2-methylpropoxy)-2,2,6,6-tetramethylpiperidin-4-yl) glutarate; or
2,4-bis {N-[1-(2-hydroxy-2-methylpropoxy)-2,2,6,6-tetramethylpiperidin-4-yl]-N-butyl amino}-6-(2-hydroxyethylamino)-s-triazine.

Para. R. The composition of any one of Paras. A-O further comprising a second hindered amine stabilizer that is:
bis(2,2,6,6-tetramethylpiperidin-4-yl) sebacate;
bis(1,2,2,6,6-pentamethylpiperidin-4-yl) sebacate;
di(1,2,2,6,6-pentamethylpiperidin-4-yl) (3,5-di-tert-butyl-4-hydroxy-benzyl)butylmalonate;
a polycondensation product of 2,4-dichloro-6-tert-octylamino-s-triazine and 4,4'-hexamethylenebis(amino-2,2,6,6-tetramethylpiperidine);
a polycondensation product of 1-(2-hydroxyethyl)-2,2,6,6-tetramethyl-4-hydroxypiperidine and succinic acid; or
N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

Para. S. The composition of any one of Paras. A-O further comprising a second hindered amine stabilizer that is:
an N-alkoxy or cyclohexyloxy substituted hindered amine;
an N-hydroxy-alkoxy substituted hindered amine; or a hindered amines where the N-atom is substituted by hydrogen, alkyl or acyl.

Para. T. The composition of any one of Paras. A-S, wherein the ultraviolet light absorber and the hindered amine light stabilizer in total are present in the candle wax from about 0.001 wt % to about 10 wt %, based on the wax.

Para. U. The composition of Para. T wherein the ultraviolet light absorber and the hindered amine light stabilizer are present in the candle wax from about 0.01 wt % to about 2 wt %, based on the wax.

Para. V. The composition of Para. U wherein the ultraviolet light absorber and the hindered amine light stabilizer are present in the candle wax from about 0.1 wt % to about 0.5 wt %, based on the wax.

Para. W. The composition of any one of Paras. A-O, wherein the ultraviolet light absorber is:
n-octadecyl-3,5-di-tert-butyl-4-hydroxyhydrocinnamate;
neopentanetetrayl tetrakis(3,5-di-tert-butyl-4-hydroxyhydrocinammate);
di-n-octadecyl-3,5-di-tert-butyl-4-hydroxybenzylphosphonate;
1,3,5-tris(3,5-di-tert-butyl-4-hydroxybenzyl)isocyanurate;
thiodiethylene bis(3,5-di-tert-butyl-4-hydroxyhydrocinnamate);
1,3,5-trimethyl-2,4,6-tris(3,5-di-tert-butyl-4-hydroxybenzyl)benzene;
3,6-dioxaoctamethylene bis(3-methyl-5-tert-butyl-4-hydroxyhydrocinnamate);
2, 6-di-tert-butyl-p-cresol;
2,2'-ethylidene-bis(4,6-di-tert-butylphenol);
1,3,5-tris(2,6-dimethyl-4-tert-butyl-3-hydroxybenzyl) isocyanurate;
1,1,3,-tris(2-methyl-4-hydroxy-5-tert-butylphenyl)butane;
1,3,5-tris[2-(3,5-di-tert-butyl-4-hydroxyhydrocinnamoyloxy)ethyl]isocyanurate;
3,5-di-(3,5-di-tert-butyl-4-hydroxybenzyl)mesitol;
hexamethylene bis(3,5-di-tert-butyl-4-hydroxyhydrocinnamate);
1-(3,5-di-tert-butyl-4-hydroxyanilino)-3,5-di(octylthio)-s-triazine;
N,N'-hexamethylene-bis(3,5-di-tert-butyl-4-hydroxyhydrocinnamamide);
calcium bis(ethyl 3,5-di-tert-butyl-4-hydroxybenzylphosphonate);
ethylene bis[3,3-di(3-tert-butyl-4-hydroxyphenyl)butyrate];
octyl 3,5-di-tert-butyl-4-hydroxybenzylmercaptoacetate;
bis(3,5-di-tert-butyl-4-hydroxyhydrocinnamoyl)hydrazide;
N,N'-bis[2-(3,5-di-tert-butyl-4-hydroxyhydrocinnamoyloxy)-ethyl]oxamide;
benzenepropanoic acid;
3,5-bis (1,1-dimethyl-ethyl)-4-hydroxy-$C_7$-$C_9$-branched alkyl esters;
N,N-di($C_{16}$-$C_{18}$-alkyl)hydroxylamine; or
a di($C_{16}$-$C_{18}$)alkyl methyl amine oxide.

Para. X. The composition of Para. W, wherein the ultraviolet light absorber is:
neopentanetetrayl tetrakis(3,5-di-tert-butyl-4-hydroxyhydrocinnamate);
n-octadecyl 3,5-di-tert-butyl-4-hydroxyhydrocinnamate;
1,3,5-trimethyl-2,4, 6-tris(3,5-di-tert-butyl-4-hydroxybenzyl)benzene;
1,3,5-tris(3,5-di-tert-butyl-4-hydroxybenzyl)isocyanurate;
2,6-di-tert-butyl-p-cresol;
benzenepropanoic acid, 3,5-bis (1,1-dimethyl-ethyl)-4-hydroxy-C7-C9-branched alkyl esters; or
2,2'-ethylidene-bis(4,6-di-tert-butylphenol).

Para. Y. The composition of Para. A-X further comprising a metal or metal compound wherein the metal is a group 2, 4, 6, 7, 8, 9, 10, 11, 12, 13, 14, 15, or 16 metal.

Para. Z. The composition of Para. Y, wherein the metal is Mg, Ca, Ti, V, Mo, W, Mn, Fe, Rh, Ni, Pt, Pd, Cu, Zn, Al, Si, Ge, Sn, or Bi.

Para. AA. The composition of Para. Z, wherein the metal is Mg, Ca, Ti, Mn, Fe, Cu, Zn, Al, Si, or Sn.

Para. BB. The composition of Para. AA, wherein the metal is Fe or Sn.

Para. CC. The composition of any one of Paras. Y-BB, wherein the metal is present in the candle wax from about 1 ppb to about 3400 ppm.

Para. DD. The composition of Para. CC, wherein the metal is present in the candle wax from about 1 ppb to about 3.4 ppm.

Para. EE. The composition of Para. DD, wherein the metal is present in the candle wax from about 15 ppb to about 600 ppm.

Para. FF. The composition of any one of Paras. AA-EE, wherein the candle wax is a paraffin wax, beeswax, a natural oil, a polyamide, an ester of a fatty acid, a fatty acid, stearin, an opacifier, or a glyceride.

Para. GG. A method of stabilizing candle wax, which method comprises adding to a candle wax composition an effective stabilizing amount of an ultraviolet light absorber; and a hindered amine light stabilizer of formula (I)

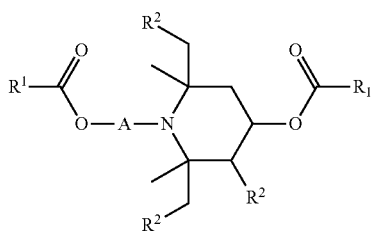

wherein:

A is —CH($R^3$)—CH$_2$— or —CH$_2$—CH($R^3$)—;

each $R^1$ is $C_1$-$C_{21}$ alkyl; acyclic $C_3$-$C_{21}$ alkenyl having 1, 2, or 3 double bonds; or $C_3$-$C_7$ cycloalkyl;

$R^2$ is H or $C_1$-$C_3$ alkyl;

$R^3$ is H or $C_1$-$C_4$ alkyl; and $R^4$ is $C_1$-$C_4$ alkyl.

Para. HH. The method of Para. GG, wherein $R^1$ is $C_1$-$C_{21}$ alkyl substituted with at least one substituent selected from $C_1$-$C_4$ alkoxy, —OH or —CN; $C_3$-$C_7$ cycloalkyl substituted with at least one substituent that is $C_1$-$C_4$ alkyl, $C_1$-$C_4$ alkoxy, —OH or —CN; or $C_4$-$C_{21}$ alkyl substituted with —CO—$R^4$.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A stabilized composition comprising:

candle wax;

an ultraviolet light absorber; and a hindered amine light stabilizer of formula (I)

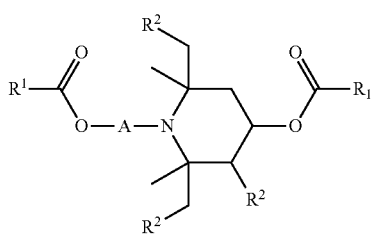

wherein:

A is —CH(R³)—CH₂— or —CH₂—CH(R³)—;

each R¹ is $C_1$-$C_{21}$ alkyl; acyclic $C_3$-$C_{21}$ alkenyl having 1, 2, or 3 double bonds; or $C_3$-$C_7$ cycloalkyl, and R¹ at each occurrence is the same;

R² is H or $C_1$-$C_3$ alkyl; and

R³ is H or $C_1$-$C_4$ alkyl.

2. The composition of claim 1, wherein R¹ is selected from the group consisting of:

$C_1$-$C_{21}$ alkyl substituted with at least one substituent of formula OR⁵ or CN, wherein R⁵ is H, methyl, ethyl, n-propyl, iso-propyl, n-butyl, sec-butyl, or tert-butyl;

$C_3$-$C_7$ cycloalkyl substituted with at least one substituent that is methyl, ethyl, n-propyl, iso-propyl, n-butyl, sec-butyl, or tert-butyl, O—R⁵ or —CN; and $C_4$-$C_{21}$ alkyl substituted with —CO—R⁴, wherein R⁴ is methyl, ethyl, n-propyl, iso-propyl, n-butyl, sec-butyl, or tert-butyl.

3. The composition of claim 1, wherein each R¹ is $C_1$-$C_{17}$ alkyl, $C_3$-$C_{12}$ alkyl, or $C_3$-$C_6$ cycloalkyl.

4. The composition of claim 3, wherein component each R¹ is a $C_1$-$C_{17}$ alkyl.

5. The composition of claim 1, wherein each R¹ is $C_1$-$C_{21}$ alkyl substituted with at least one substituent of $C_1$-$C_4$ alkoxy or —OH.

6. The composition of claim 1, wherein R² is H.

7. The composition of claim 1, wherein A is —CH₂—CH₂—, —CH(CH₃)—CH₂— or —CH₂—CH(CH₃)—.

8. The composition of claim 1, wherein the hindered amine light stabilizer is:

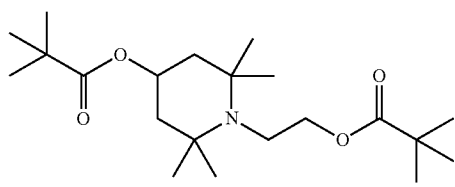

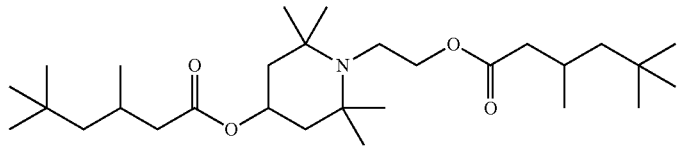

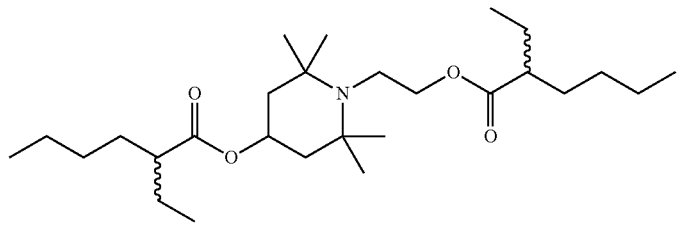

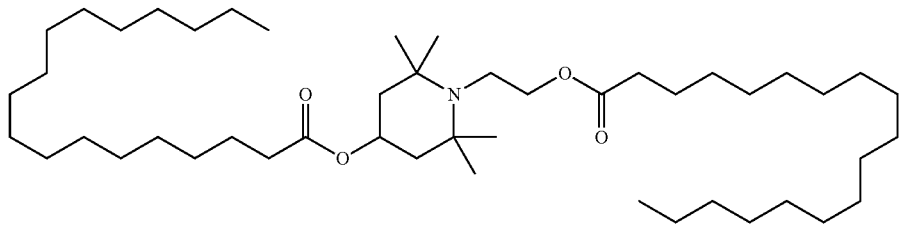

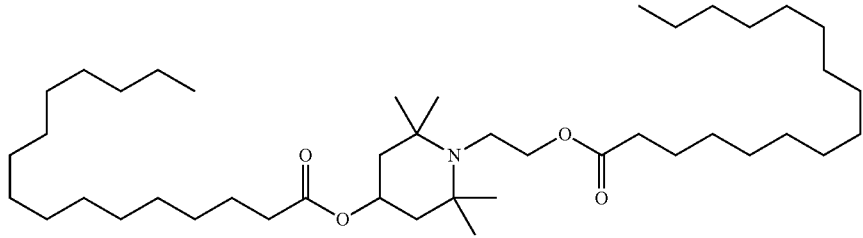

-continued

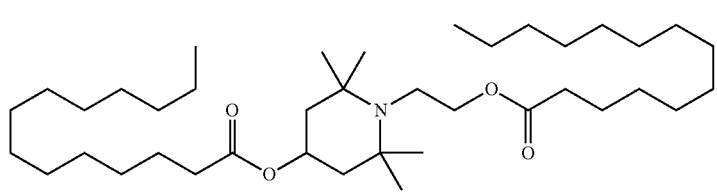
(6)

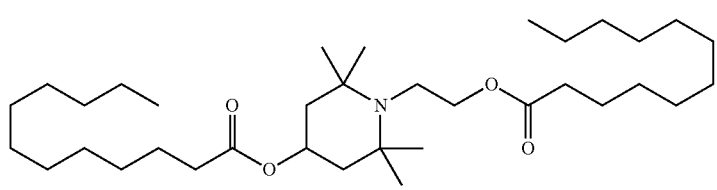
(7)

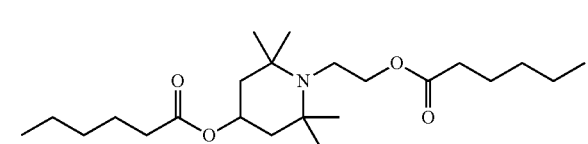
(8)

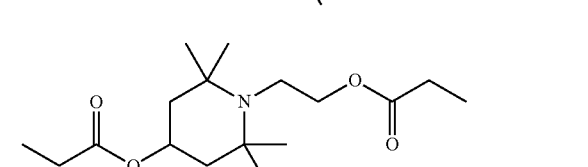
(9)

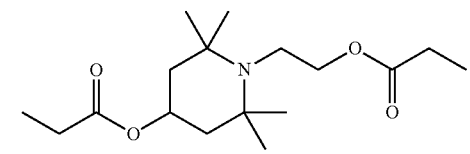
(10)

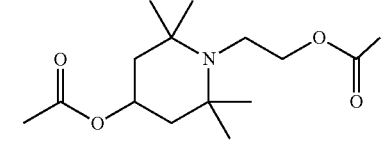
(11)

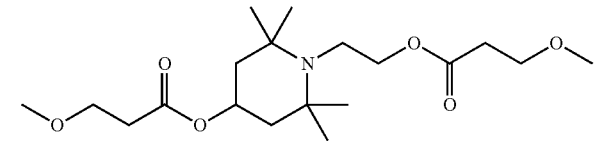
(12)

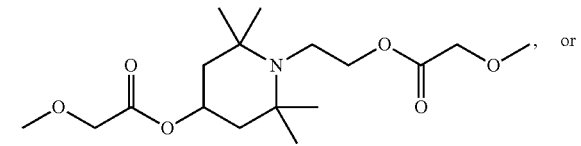
, or

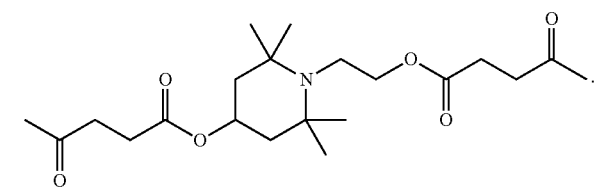
(13)

9. The composition of claim 1, wherein the ultraviolet light absorber is at least one compound selected from the group consisting of: benzotriazole, benzophenone, alpha-cyanoacrylate, oxanilide, s-triazine, cinnamate, malonate, benzoate, salicylate and benzoxazin-4-one.

10. The composition of claim 9, wherein the ultraviolet light absorber is a benzotriazole, a benzophenone, or an s-triazine.

11. The composition of claim 1, wherein the ultraviolet light absorber is:
4-octyloxy-2-hydroxy-benzophenone;
4-methoxy-2-hydroxy-benzophenone;
2-(2-hydroxy-5-methylphenyl)-2H-benzotriazole;
2-(2-hydroxy-5-tert-octylphenyl-2H-benzotriazole;
2-(2-hydroxy-3,5-di-tert-amylphenyl)-2H-benzotriazole;

octyl 3-(benzotriazol-2-yl)-5-tert-butyl-4-hydroxyhydrocinnamate;
2-(2-hydroxy-3,5-di-tert-butylphenyl)-2H-benzotriazole;
2-(2-hydroxy-5-tert-butylphenyl)-2H-benzotriazole;
5-chloro-2-(2-hydroxy-3,5-di-tert-butylphenyl)-2H-benzotriazole;
5-chloro-2-(2-hydroxy-3-tert-butyl-5-methylphenyl)-2H-benzotriazole;
2-(2-hydroxy-3-sec-butyl-5-tert-butylphenyl)-2H-benzotriazole;
2-(2-hydroxy-4-octyloxyphenyl)-2H-benzotriazole;
2-(2-hydroxy-3-dodecyl-5-methylphenyl)-2H-benzotriazole;
2-[2-hydroxy-3,5-di(alpha,alpha-dimethylbenzyl)phenyl]-2H-benzotriazole;
2-[2-hydroxy-3-(α,α-dimethylbenzyl)-5-tert-octylphenyl]-2H-benzotriazole;
2-{2-hydroxy-3-tert-butyl-5-[2-(Ω-hydroxy-octa(ethyleneoxy)carbonyl)-ethyl]phenyl}-2H-benzotriazole;
2-{2-hydroxy-3-tert-butyl-5-[2-(octyloxy)carbonyl)ethyl]phenyl}-2H-benzotriazole;
2-ethylhexyl p-methoxycinnamate;
4-methoxy-2,2'-dihydroxybenzophenone;
4,4'-dimethoxy-2,2'-dihydroxybenzophenone;
2,4-bis(2,4-dimethylphenyl)-6-(2-hydroxy-4-octyloxyphenyl)-s-triazine;
2,4-diphenyl-6-(2-hydroxy-4-hexyloxyphenyl)-s-triazine;
2,4-bis(2,4-dimethylphenyl)-6-[2-hydroxy-4-(3-dodecyloxy-2-hydroxy-propoxy)phenyl]-s-triazine; or
2,4-bis(2,4-dimethylphenyl)-6-[2-hydroxy-4-(3-dodecyloxy-2-hydroxy-propoxy) -5-α-cumyl-phenyl]-s-triazine.

12. The composition of claim 1 further comprising a second hindered amine light stabilizer, a phenolic antioxidant, an organic phosphorus stabilizer, a hydroxylamine stabilizer, a nitrone stabilizer, or an amine oxide stabilizer.

13. The composition of claim 1 further comprising a second hindered amine stabilizer that is:
bis(1-octyloxy-2,2,6,6-tetramethylpiperidin-4-yl) sebacate;
bis(1-cyclohexyloxy-2,2,6,6-tetramethylpiperidin-4-yl) sebacate;
1-cyclohexyloxy-2,2,6,6-tetramethyl-4-octadecylaminopiperidine;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl) adipate;
an oligomeric compound which is the condensation product of 4,4'-hexa-methylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;
an oligomeric compound which is the condensation product of 4,4'-hexa-methylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;
1-methoxy-4-hydroxy-2,2,6,6-tetramethylpiperidine;
1-octyloxy-4-hydroxy-2,2,6,6-tetramethylpiperidine;
1-cyclohexyloxy-4-hydroxy-2,2,6,6-tetramethylpiperidine;
1-methoxy-4-oxo-2,2,6,6-tetramethylpiperidine;
1-octyloxy-4-oxo-2,2,6,6-tetramethylpiperidine;
1-cyclohexyloxy-4-oxo-2,2,6,6-tetramethylpiperidine;
bis(1-heptyloxy-2,2,6,6-tetramethylpiperidin-4-yl) sebacate;
bis(1-nonyloxy-2,2,6,6-tetramethylpiperidin-4-yl) sebacate;
bis(1-dodecyloxy-2,2,6,6-tetramethylpiperidin-4-yl) sebacate; or
N,N',N'',N'''-tetrakis[(4,6-bis(butyl-1-octyloxy-2,2,6,6-pentamethylpiperidin-4-yl)-amino-s-triazin-2-yl]-1,10-diamino-4,7-diazadecane.

14. The composition of claim 1 further comprising a second hindered amine stabilizer that is:
1-(2-hydroxy-2-methylpropoxy)-4-octadecanoyloxy-2,2,6,6-tetramethylpiperidine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
bis(1-(2-hydroxy-2-methylpropoxy)-2,2,6,6-tetramethylpiperidin-4-yl) sebacate;
bis(1-(2-hydroxy-2-methylpropoxy)-2,2,6,6-tetramethylpiperidin-4-yl) adipate;
bis(1-(2-hydroxy-2-methylpropoxy)-2,2,6,6-tetramethylpiperidin-4-yl) succinate;
bis(1-(2-hydroxy-2-methylpropoxy)-2,2,6,6-tetramethylpiperidin-4-yl) glutarate;
2,4-bis {N-[1-(2-hydroxy-2-methylpropoxy)-2,2,6,6-tetramethylpiperidin-4-yl]-N-butylamino}-6-(2-hydroxyethylamino)-s-triazine;
bis(2,2,6,6-tetramethylpiperidin-4-yl) sebacate;
bis(1,2,2,6,6-pentamethylpiperidin-4-yl) sebacate;
di(1,2,2,6,6-pentamethylpiperidin-4-yl) (3,5-di-tert-butyl-4-hydroxy-benzyl)butylmalonate;
a polycondensation product of 2,4-dichloro-6-tert-octylamino-s-triazine and 4,4'-hexamethylenebis(amino-2,2,6,6-tetramethylpiperidine);
a polycondensation product of 1-(2-hydroxyethyl)-2,2,6,6-tetramethyl-4-hydroxypiperidine and succinic acid; or
N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

15. The composition of claim 1 further comprising a second hindered amine stabilizer that is:
an N-alkoxy or cyclohexyloxy substituted hindered amine;
an N-hydroxy-alkoxy substituted hindered amine; or
a hindered amines where the N-atom is substituted by hydrogen, alkyl or acyl.

16. The composition of claim 1, wherein the ultraviolet light absorber and the hindered amine light stabilizer in total are present in the candle wax from about 0.001 wt % to about 10 wt %, based on the wax.

17. The composition of claim 1, wherein the ultraviolet light absorber is:
n-octadecyl-3,5-di-tert-butyl-4-hydroxyhydrocinnamate;
neopentanetetrayl tetrakis(3,5-di-tert-butyl-4-hydroxyhydrocinammate);
di-n-octadecyl-3,5-di-tert-butyl-4-hydroxybenzylphosphonate;
1,3,5-tris(3,5-di-tert-butyl-4-hydroxybenzyl)isocyanurate;
thiodiethylene bis(3,5-di-tert-butyl-4-hydroxyhydrocinnamate);
1,3,5-trimethyl-2,4,6-tris(3,5-di-tert-butyl-4-hydroxybenzyl)benzene;

3,6-dioxaoctamethylene bis(3-methyl-5-tert-butyl-4-hydroxyhydrocinnamate);
2,6-di-tert-butyl-p-cresol;
2,2'-ethylidene-bis(4,6-di-tert-butylphenol);
1,3,5-tris(2,6-dimethyl-4-tert-butyl-3-hydroxybenzyl) isocyanurate;
1,1,3,-tris(2-methyl-4-hydroxy-5-tert-butylphenyl)butane;
1,3,5-tris[2-(3,5-di-tert-butyl-4-hydroxyhydrocinnamoyloxy)ethyl] isocyanurate;
3,5-di-(3,5-di-tert-butyl-4-hydroxybenzyl)mesitol;
hexamethylene bis(3,5-di-tert-butyl-4-hydroxyhydrocinnamate);
1-(3,5-di-tert-butyl-4-hydroxyanilino)-3,5-di(octylthio)-s-triazine;
N,N'-hexamethylene-bis(3,5-di-tert-butyl-4-hydroxyhydrocinnamamide);
calcium bis(ethyl 3,5-di-tert-butyl-4-hydroxybenzylphosphonate);
ethylene bis[3,3-di(3-tert-butyl-4-hydroxyphenyl)butyrate];
octyl 3,5-di-tert-butyl-4-hydroxybenzylmercaptoacetate;
bis(3,5-di-tert-butyl-4-hydroxyhydrocinnamoyl)hydrazide;
N,N'-bis[2-(3,5-di-tert-butyl-4-hydroxyhydrocinnamoyloxy)-ethyl]oxamide;
benzenepropanoic acid;
3,5-bis (1,1-dimethyl-ethyl)-4-hydroxy-$C_7$-$C_9$-branched alkyl esters;
N,N-di($C_{16}$-$C_{18}$-alkyl)hydroxylamine; or
a di($C_{16}$-$C_{18}$)alkyl methyl amine oxide.

18. The composition of claim 1 further comprising a metal or metal compound wherein the metal is Mg, Ca, Ti, V, Mo, W, Mn, Fe, Rh, Ni, Pt, Pd, Cu, Zn, Al, Si, Ge, Sn, or Bi.

19. A method of stabilizing candle wax, which method comprises adding to a candle wax composition an effective stabilizing amount of
an ultraviolet light absorber; and
a hindered amine light stabilizer of formula (I)

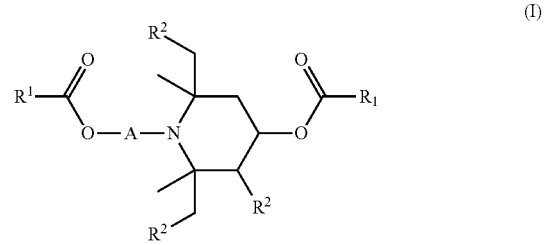

wherein:
A is —CH($R^3$)—$CH_2$— or —$CH_2$—CH($R^3$)—;
each $R^1$ is $C_1$-$C_{21}$ alkyl; acyclic $C_3$-$C_{21}$ alkenyl having 1, 2, or 3 double bonds; or $C_3$-$C_7$ cycloalkyl, and $R_1$ at each occurrence is the same;
$R^2$ is H or $C_1$-$C_3$ alkyl; and
$R^3$ is H or $C_1$-$C_4$ alkyl.

20. The composition of claim 1, wherein the candle wax is selected from paraffin, beeswax, natural oils, polyamide plus fatty acids and esters thereof, fatty acids, opacifiers, glycerides plus oxidized wax, alcohols, or mixtures thereof.

* * * * *